United States Patent [19]

(12) United States Patent
Liao et al.

(10) Patent No.: US 10,136,362 B2
(45) Date of Patent: Nov. 20, 2018

(54) CAPABILITY NEGOTIATION METHOD, SYSTEM AND APPARATUS

(71) Applicant: Huawei Technologies Co., Ltd., Shenzhen (CN)

(72) Inventors: Min Liao, Beijing (CN); Yufang Wang, Beijing (CN); Chong Zhang, Beijing (CN); Hui Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 15/142,978

(22) Filed: Apr. 29, 2016

(65) Prior Publication Data

US 2016/0262055 A1 Sep. 8, 2016

Related U.S. Application Data

(63) Continuation of application No. PCT/CN2013/086351, filed on Oct. 31, 2013.

(51) Int. Cl.
*H04W 28/18* (2009.01)
*H04L 29/06* (2006.01)
(Continued)

(52) U.S. Cl.
CPC .......... *H04W 28/18* (2013.01); *H04L 65/80* (2013.01); *H04L 69/22* (2013.01); *H04W 28/24* (2013.01); *H04W 88/08* (2013.01); *H04W 88/16* (2013.01)

(58) Field of Classification Search
CPC ........ H04W 28/18; H04W 88/08; H04L 69/22
(Continued)

(56) References Cited

U.S. PATENT DOCUMENTS 7,499,709 B2 * 3/2009 Das ................ H04B 7/0634
455/455
8,917,662 B2 * 12/2014 Kim ................ H04W 28/08
370/328
(Continued)

FOREIGN PATENT DOCUMENTS

CN 1753366 A 3/2006
CN 1761261 A 4/2006
(Continued)

OTHER PUBLICATIONS

"3rd Generation Partnership Project; Technical Specification Group Services and System Aspects; General Packet Radio Service (GPRS); Service Description; Stage 2 (Release 12)," 3GPP TS 23.060 V12.2.0, Sep. 2013, pp. 1-339.
(Continued)

*Primary Examiner* — Faisal Choudhury
(74) *Attorney, Agent, or Firm* — Slater Matsil, LLP

(57) ABSTRACT

Embodiments of the present invention provide a capability negotiation method, system and apparatus, which are applied to the field of communications, and can improve the flexibility of capability negotiation. The capability negotiation method is applied to a base station, including: acquiring a gateway capability identifier, where the gateway capability identifier is a description of an end to end quality of service EtoE QoS control capability of a gateway; parsing the gateway capability identifier to obtain the EtoE QoS control capability of the gateway; and determining whether the EtoE QoS control capability of the gateway matches a local EtoE QoS control capability, so that when the EtoE QoS control capability of the gateway matches the local EtoE QoS control capability, EtoE QoS control is established.

19 Claims, 12 Drawing Sheets

(51) Int. Cl.
*H04W 28/24* (2009.01)
*H04W 4/00* (2018.01)
*H04W 88/08* (2009.01)
*H04W 88/16* (2009.01)

(58) Field of Classification Search
USPC .......................................................... 370/328
See application file for complete search history.

(56) References Cited

U.S. PATENT DOCUMENTS

| | | | | |
|---|---|---|---|---|
| 2006/0098627 | A1* | 5/2006 | Karaoguz | H04L 12/2856 370/352 |
| 2008/0273520 | A1 | 11/2008 | Kim et al. | |
| 2010/0046369 | A1 | 2/2010 | Zhao et al. | |
| 2010/0074109 | A1 | 3/2010 | Klingenbrunn et al. | |
| 2011/0103310 | A1* | 5/2011 | Stojanovski | H04L 12/66 370/328 |
| 2012/0270574 | A1* | 10/2012 | Nishida | H04W 68/02 455/458 |
| 2013/0051331 | A1* | 2/2013 | Bao | H04W 28/24 370/329 |
| 2014/0003357 | A1* | 1/2014 | Ejzak | H04W 76/12 370/329 |
| 2014/0056245 | A1 | 2/2014 | Qin et al. | |
| 2014/0219179 | A1* | 8/2014 | Zakrzewski | H04W 4/18 370/328 |
| 2014/0241232 | A1* | 8/2014 | Damji | H04L 25/0204 370/312 |
| 2014/0369197 | A1* | 12/2014 | Stenfelt | H04W 28/0289 370/235 |
| 2015/0382245 | A1* | 12/2015 | Cao | H04W 28/20 370/328 |
| 2016/0112896 | A1* | 4/2016 | Karampatsis | H04W 28/0252 370/230.1 |

FOREIGN PATENT DOCUMENTS

| | | |
|---|---|---|
| CN | 101146322 A | 3/2008 |
| CN | 101588606 A | 11/2009 |
| CN | 101895938 A | 11/2010 |
| CN | 101981963 A | 2/2011 |
| EP | 2675234 A1 | 12/2013 |
| RU | 2011115216 A | 10/2012 |
| WO | 2010133004 A1 | 11/2010 |
| WO | 2012107004 A1 | 8/2012 |

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-TRAN) Access (Release 12)," 3GPP TS 23.401 V12.2.0, Sep. 2013, pp. 1-293.

"3rd Generation Partnership Project; Technical SpecificationGroup Radio Access Network; UTRAN Lu Interface Radio Access Network Application Part (RANAP) Signalling (Release 11)," 3GPP TS 25.413 V11.4.0, Jun. 2013, pp. 1-441.

"3rd Generation Partnership Project; Technical Specification Group Core Network and Terminals; General Packet Radio Service (GPRS); GPRS Tunneling Protocol (GTP) Across the Gn and Gp Interface (Release 12)," 3GPP TS 29.060 V12.2.0, Sep. 2013, pp. 1-177.

"3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 12)," 3GPP TS 29.274 V12.2.0, Sep. 2013, pp. 1-230.

"3rd Generation Partnership Project; Technical Specification Group Core Network and Terminals; General Packet Radio System (GPRS) Tunnelling Protocol User Plane (GTPv1-U) (Release 11)," 3GPP TS 29.281 V11.6.0, Mar. 2013, pp. 1-27.

"3rd Generation Partnership Project; Technical Specification Group Radio Access Network; Evolved Universal Terrestrial Radio Access Network (E-TRAN); S1 Application Protocol (S1AP) (Release 11)," 3 GPP TS 36.413 V11.5.0, Sep. 2013, pp. 1-274.

\* cited by examiner

CAPABILITY NEGOTIATION METHOD, SYSTEM AND APPARATUS

This application is a continuation of International Application No. PCT/CN2013/086351, filed on Oct. 31, 2013, which is hereby incorporated by reference in its entirety.

TECHNICAL FIELD

The present invention relates to the field of communications, and in particular, to a capability negotiation method, system and apparatus.

BACKGROUND

As mobile phones and other user terminals become more smart, and the mobile Internet is manifesting a growth, an operator needs to provide a more optimized network, and network optimization is mainly embodied in aspects such as on-demand provision of bandwidths, assurance of quality of service and service experience improvement. To use network resources more efficiently, improve service experience of a user and gain more profits, the operator needs to use an EtoE QoS (End to End Quality of Service) control solution to further optimize the network resources, and utilize the network resources more efficiently. However, the EtoE QoS control solution requires that EtoE QoS control between network elements can be performed only when EtoE QoS control capabilities of involved network elements match each other. For example, when a user equipment performs a data transmission service, a capability of an RAN (Radio Access Network) needs to match a capability of a GGSN (Gateway General Packet Radio Service Support Node) or a PGW (Packet Data Network Gateway), otherwise, EtoE QoS control between the RAN and the GGSN cannot be performed. Therefore, before EtoE QoS control is deployed, EtoE QoS control capability negotiation needs to be performed first.

In the prior art, when an address of a peer network element is configured on a local network element during initialization of a communications system, it is considered by default that the peer network element has a capability of deploying EtoE QoS control; the capability negotiation between the local network element and the peer network element is static inter-device negotiation, and not a dynamic capability negotiation of EtoE QoS control, and exhibits low flexibility in capability negotiation.

SUMMARY

Embodiments of the present invention provide a capability negotiation method, system and apparatus, which can improve the flexibility of capability negotiation.

To achieve the foregoing objective, the embodiments of the present invention use the following technical solutions:

According to a first aspect, a capability negotiation method is provided, where the method is applied to a base station and includes: acquiring a gateway capability identifier, where the gateway capability identifier is a description of an end to end quality of service EtoE QoS control capability of a gateway; parsing the gateway capability identifier to obtain the EtoE QoS control capability of the gateway; and determining whether the EtoE QoS control capability of the gateway matches a local EtoE QoS control capability, so that when the EtoE QoS control capability of the gateway matches the local EtoE QoS control capability, EtoE QoS control is established.

With reference to the first aspect, in a first possible implementation, before the acquiring a gateway capability identifier, the method further includes: sending a base station capability identifier to the gateway, or sending the base station capability identifier to an intermediate network element, where the base station capability identifier is a description of an EtoE QoS control capability of the base station.

With reference to the first aspect, in a second possible implementation, the acquiring a gateway capability identifier includes: receiving a downlink data packet sent by the gateway, where the downlink data packet includes the gateway capability identifier; and parsing the downlink data packet to obtain the gateway capability identifier.

With reference to the first possible implementation, in a third possible implementation, the sending a base station capability identifier to the gateway includes: generating an uplink data packet, where the uplink data packet includes the base station capability identifier; and sending the uplink data packet to the gateway.

With reference to the third possible implementation, in a fourth possible implementation, the uplink data packet further includes heartbeat information of the base station, and the heartbeat information is a state description of the EtoE QoS control capability of the base station.

With reference to the fourth possible implementation, in a fifth possible implementation, the base station capability identifier is located in an extension header of a General Packet Radio Service Tunnelling Protocol for the user plane header of the uplink data packet; and the heartbeat information is located in the extension header of the General Packet Radio Service Tunnelling Protocol for the user plane header of the uplink data packet.

With reference to the first aspect, in a sixth possible implementation, the acquiring a gateway capability identifier includes: receiving a first signaling message sent by an intermediate network element, where the first signaling message includes the gateway capability identifier, and the first signaling message is generated after the intermediate network element obtains the gateway capability identifier by parsing a fourth signaling message sent by the gateway; and parsing the first signaling message to obtain the gateway capability identifier.

With reference to the first possible implementation, in a seventh possible implementation, the sending a base station capability identifier to an intermediate network element includes: generating a second signaling message, where the second signaling message includes the base station capability identifier; and sending the second signaling message to the intermediate network element, so that the intermediate network element parses the second signaling message to obtain the base station capability identifier, and generates and sends a third signaling message to the gateway, where the third signaling message includes the base station capability identifier.

According to a second aspect, a capability negotiation method is provided, where the method is applied to a gateway and includes: acquiring a base station capability identifier, where the base station capability identifier is a description of an EtoE QoS control capability of a base station; parsing the base station capability identifier to obtain the EtoE QoS control capability of the base station; and determining whether the EtoE QoS control capability of the base station matches a local EtoE QoS control capability, so that when an EtoE QoS control capability of the base station matches the local EtoE QoS control capability, EtoE QoS control is established.

With reference to the second aspect, in a first possible implementation, before the acquiring a base station capability identifier, the method further includes: sending a gateway capability identifier to the base station, or sending the gateway capability identifier to an intermediate network element, where the gateway capability identifier is a description of an EtoE QoS control capability of the gateway.

With reference to the second aspect, in a second possible implementation, the acquiring a base station capability identifier includes: receiving an uplink data packet sent by the base station, where the uplink data packet includes the base station capability identifier; and parsing the uplink data packet to obtain the base station capability identifier.

With reference to the first possible implementation, in a third possible implementation, the sending a gateway capability identifier to the base station includes: generating a downlink data packet, where the downlink data packet includes the gateway capability identifier; and sending the downlink data packet to the base station.

With reference to the third possible implementation, in a fourth possible implementation, the uplink data packet further includes heartbeat information of the base station, and the heartbeat information is a state description of the EtoE QoS control capability supported by the base station. The method further includes parsing the uplink data packet to obtain the heartbeat information, and determining a state of the EtoE QoS control capability of the base station according to the heartbeat information.

With reference to the fourth possible implementation, in a fifth possible implementation, the gateway capability identifier is located in an extension header of a General Packet Radio Service Tunnelling Protocol for the user plane header of the downlink data packet. The heartbeat information is located in an extension header of a General Packet Radio Service Tunnelling Protocol for the user plane header of the uplink data packet.

With reference to the second aspect, in a sixth possible implementation, the acquiring a base station capability identifier includes receiving a third signaling message sent by an intermediate network element, where the third signaling message includes the base station capability identifier, and the third signaling message is generated after the intermediate network element obtains the base station capability identifier by parsing a second signaling message sent by the base station; and parsing the third signaling message to obtain the base station capability identifier.

With reference to the first possible implementation, in a seventh possible implementation, the sending a gateway capability identifier to an intermediate network element includes: generating a fourth signaling message, where the fourth signaling message includes the gateway capability identifier; and sending the fourth signaling message to the intermediate network element, so that the intermediate network element parses the fourth signaling message to obtain the gateway capability identifier, and generates and sends a first signaling message to the base station, where the first signaling message includes the gateway capability identifier.

According to a third aspect, a capability negotiation method is provided, where the method is applied to an intermediate network element and includes: receiving a second signaling message sent by a base station, where the second signaling message includes a base station capability identifier, and the base station capability identifier is a description of an EtoE QoS control capability of the base station; parsing the second signaling message to obtain the base station capability identifier; generating a third signaling message, where the third signaling message includes the base station capability identifier; and sending the third signaling message to a gateway, so that the gateway parses the third signaling message to obtain the base station capability identifier.

With reference to the third aspect, in a first possible implementation, the method further includes: receiving a fourth signaling message sent by the gateway, where the fourth signaling message includes a gateway capability identifier, and the gateway capability identifier is a description of an EtoE QoS control capability of the gateway; parsing the fourth signaling message to obtain the gateway capability identifier; generating a first signaling message, where the first signaling message includes the gateway capability identifier; and sending the first signaling message to the base station, so that the base station parses the first signaling message to obtain the gateway capability identifier.

According to a fourth aspect, a base station is provided, including: an acquiring unit, configured to acquire a gateway capability identifier, where the gateway capability identifier is a description of an end to end quality of service EtoE QoS control capability of a gateway; a parsing unit, configured to parse the gateway capability identifier acquired by the acquiring unit, to obtain the EtoE QoS control capability of the gateway; and a determining unit, configured to determine whether the EtoE QoS control capability of the gateway acquired by the parsing unit matches a local EtoE QoS control capability, so that when the EtoE QoS control capability of the gateway matches the local EtoE QoS control capability, EtoE QoS control is established.

With reference to the fourth aspect, in a first possible implementation, the base station further includes: a sending unit, configured to send a base station capability identifier to the gateway, or send the base station capability identifier to an intermediate network element, where the base station capability identifier is a description of an EtoE QoS control capability of the base station.

With reference to the fourth aspect, in a second possible implementation, the acquiring unit is specifically configured to: receive a downlink data packet sent by the gateway, where the downlink data packet includes the gateway capability identifier; and parse the downlink data packet to obtain the gateway capability identifier.

With reference to the first possible implementation, in a third possible implementation, the sending unit is specifically configured to: generate an uplink data packet, where the uplink data packet includes the base station capability identifier; and send the uplink data packet to the gateway.

With reference to the third possible implementation, in a fourth possible implementation, the uplink data packet further includes heartbeat information of the base station, and the heartbeat information is a state description of the EtoE QoS control capability of the base station.

With reference to the fourth possible implementation, in a fifth possible implementation, the base station capability identifier is located in an extension header of a General Packet Radio Service Tunnelling Protocol for the user plane header of the uplink data packet; and the heartbeat information is located in the extension header of the General Packet Radio Service Tunnelling Protocol for the user plane header of the uplink data packet.

With reference to the fourth aspect, in a sixth possible implementation, the acquiring unit is further configured to: receive a first signaling message sent by an intermediate network element, where the first signaling message includes the gateway capability identifier, and the first signaling message is generated after the intermediate network element obtains the gateway capability identifier by parsing a fourth signaling message sent by the gateway; and parse the first signaling message to obtain the gateway capability identifier.

With reference to the first possible implementation, in a seventh possible implementation, the sending unit is further configured to: generate a second signaling message, where the second signaling message includes the base station capability identifier; and send the second signaling message to the intermediate network element, so that the intermediate network element parses the second signaling message to obtain the base station capability identifier, and generates and sends a third signaling message to the gateway, where the third signaling message includes the base station capability identifier.

According to a fifth aspect, a gateway is provided, including: an acquiring unit, configured to acquire a base station capability identifier, where the base station capability identifier is a description of an EtoE QoS control capability of a base station; a parsing unit, configured to parse the base station capability identifier acquired by the acquiring unit, to obtain the EtoE QoS control capability of the base station; and a determining unit, configured to determine whether the EtoE QoS control capability of the base station acquired by the parsing unit matches a local EtoE QoS control capability, so that when an EtoE QoS control capability of the base station matches the local EtoE QoS control capability, EtoE QoS control is established.

With reference to the fifth aspect, in a first possible implementation, the gateway further includes: a sending unit, configured to send a gateway capability identifier to the base station, or send the gateway capability identifier to an intermediate network element, where the gateway capability identifier is a description of an EtoE QoS control capability of the gateway.

With reference to the fifth aspect, in a second possible implementation, the acquiring unit is specifically configured to: receive an uplink data packet sent by the base station, where the uplink data packet includes the base station capability identifier; and parse the uplink data packet to obtain the base station capability identifier.

With reference to the first possible implementation, in a third possible implementation, the sending unit is specifically configured to: generate a downlink data packet, where the downlink data packet includes the gateway capability identifier; and send the downlink data packet to the base station.

With reference to the third possible implementation, in a fourth possible implementation, the uplink data packet further includes heartbeat information of the base station, and the heartbeat information is a state description of the EtoE QoS control capability supported by the base station, and the parsing unit is further configured to parse the uplink data packet to obtain the heartbeat information, and determine a state of the EtoE QoS control capability of the base station according to the heartbeat information.

With reference to the fourth possible implementation, in a fifth possible implementation, the gateway capability identifier is located in an extension header of a General Packet Radio Service Tunnelling Protocol for the user plane header of the downlink data packet; and the heartbeat information is located in an extension header of a General Packet Radio Service Tunnelling Protocol for the user plane header of the uplink data packet.

With reference to the fifth aspect, in a sixth possible implementation, the acquiring unit is further configured to: receive a third signaling message sent by an intermediate network element, where the third signaling message includes the base station capability identifier, and the third signaling message is generated after the intermediate network element obtains the base station capability identifier by parsing a second signaling message sent by the base station; and parse the third signaling message to obtain the base station capability identifier.

With reference to the first possible implementation, in a seventh possible implementation, the sending unit is further configured to: generate a fourth signaling message, where the fourth signaling message includes the gateway capability identifier; and send the fourth signaling message to the intermediate network element, so that the intermediate network element parses the fourth signaling message to obtain the gateway capability identifier, and generates and sends a first signaling message to the base station, where the first signaling message includes the gateway capability identifier.

According to a sixth aspect, an intermediate network element is provided, including: a receiving unit, configured to receive a second signaling message sent by a base station, where the second signaling message includes a base station capability identifier, and the base station capability identifier is a description of an EtoE QoS control capability of the base station; a parsing unit, configured to parse the second signaling message received by the receiving unit, to obtain the base station capability identifier; a generating unit, configured to generate a third signaling message according to the base station capability identifier obtained by the parsing unit, where the third signaling message includes the base station capability identifier; and a sending unit, configured to send the third signaling message generated by the generating unit to a gateway, so that the gateway parses the third signaling message to obtain the base station capability identifier.

With reference to the sixth aspect, in a first possible implementation, the receiving unit is further configured to receive a fourth signaling message sent by the gateway, where the fourth signaling message includes a gateway capability identifier, and the gateway capability identifier is a description of an EtoE QoS control capability of the gateway; the parsing unit is further configured to parse the fourth signaling message received by the receiving unit, to obtain the gateway capability identifier; the generating unit is further configured to generate a first signaling message according to the gateway capability identifier obtained by the parsing unit, where the first signaling message includes the gateway capability identifier; and the sending unit is further configured to send the first signaling message generated by the generating unit to the base station, so that the base station parses the first signaling message to obtain the gateway capability identifier.

According to a seventh aspect, a capability negotiation system is provided, including: any base station according to the foregoing description; any gateway according to the foregoing description; and any intermediate network element according to the foregoing description.

According to an eighth aspect, a base station is provided, including: a processor, configured to acquire a gateway capability identifier, where the gateway capability identifier is a description of an end to end quality of service EtoE QoS control capability of a gateway; parse the gateway capability identifier to obtain the EtoE QoS control capability of the gateway; and determine whether the EtoE QoS control capability of the gateway matches a local EtoE QoS control capability, so that when the EtoE QoS control capability of the gateway matches the local EtoE QoS control capability, EtoE QoS control is established.

With reference to the eighth aspect, in a first possible implementation, the base station further includes a transmitter configured to send a base station capability identifier to the gateway, or send the base station capability identifier to an intermediate network element, where the base station capability identifier is a description of an EtoE QoS control capability of the base station.

With reference to the eighth aspect, in a second possible implementation, the base station further includes a first receiver configured to receive a downlink data packet sent by the gateway, where the downlink data packet includes the gateway capability identifier. The processor is specifically configured to parse the downlink data packet to obtain the gateway capability identifier.

With reference to the first possible implementation, in a third possible implementation, the processor is specifically configured to generate an uplink data packet, where the uplink data packet includes the base station capability identifier; and the transmitter is specifically configured to send the uplink data packet to the gateway.

With reference to the third possible implementation, in a fourth possible implementation, the uplink data packet further includes heartbeat information of the base station, and the heartbeat information is a state description of the EtoE QoS control capability of the base station.

With reference to the fourth possible implementation, in a fifth possible implementation, the base station capability identifier is located in an extension header of a General Packet Radio Service Tunnelling Protocol for the user plane header of the uplink data packet; and the heartbeat information is located in the extension header of the General Packet Radio Service Tunnelling Protocol for the user plane header of the uplink data packet.

With reference to the eighth aspect, in a sixth possible implementation, the base station further includes a second receiver, configured to receive a first signaling message sent by an intermediate network element, where the first signaling message includes the gateway capability identifier, and the first signaling message is generated after the intermediate network element obtains the gateway capability identifier by parsing a fourth signaling message sent by the gateway; and the processor is further configured to parse the first signaling message to obtain the gateway capability identifier.

With reference to the first possible implementation, in a seventh possible implementation, the processor is further configured to generate a second signaling message, where the second signaling message includes the base station capability identifier; and the transmitter is further configured to send the second signaling message to the intermediate network element, so that the intermediate network element parses the second signaling message to obtain the base station capability identifier, and generates and sends a third signaling message to the gateway, where the third signaling message includes the base station capability identifier.

According to a ninth aspect, a gateway is provided, including: a processor, configured to acquire a base station capability identifier, where the base station capability identifier is a description of an EtoE QoS control capability of a base station; parse the base station capability identifier to obtain the EtoE QoS control capability of the base station; and determine whether the EtoE QoS control capability of the base station matches a local EtoE QoS control capability, so that when an EtoE QoS control capability of the base station matches the local EtoE QoS control capability, EtoE QoS control is established.

With reference to the ninth aspect, in a first possible implementation, the gateway further includes: a transmitter, configured to send a gateway capability identifier to the base station, or send the gateway capability identifier to an intermediate network element, where the gateway capability identifier is a description of the EtoE QoS control capability of the gateway.

With reference to the ninth aspect, in a second possible implementation, the gateway further includes a first receiver, configured to receive an uplink data packet sent by the base station, where the uplink data packet includes the base station capability identifier; and the processor is specifically configured to parse the uplink data packet to obtain the base station capability identifier.

With reference to the first possible implementation, in a third possible implementation, the processor is specifically configured to generate a downlink data packet, where the downlink data packet includes the gateway capability identifier; and the transmitter is configured to send the downlink data packet to the base station.

With reference to the third possible implementation, in a fourth possible implementation, the uplink data packet further includes heartbeat information of the base station, and the heartbeat information is a state description of the EtoE QoS control capability supported by the base station, and the processor is further configured to: parse the uplink data packet to obtain the heartbeat information, and determine a state of the EtoE QoS control capability of the base station according to the heartbeat information.

With reference to the fourth possible implementation, in a fifth possible implementation, the gateway capability identifier is located in an extension header of a General Packet Radio Service Tunnelling Protocol for the user plane header of the downlink data packet; and the heartbeat information is located in an extension header of a General Packet Radio Service Tunnelling Protocol for the user plane header of the uplink data packet.

With reference to the ninth aspect, in a sixth possible implementation, the gateway further includes a second receiver, configured to receive a third signaling message sent by an intermediate network element, where the third signaling message includes the base station capability identifier, and the third signaling message is generated after the intermediate network element obtains the base station capability identifier by parsing a second signaling message sent by the base station; and the processor is further configured to parse the third signaling message to obtain the base station capability identifier.

With reference to the first possible implementation, in a seventh possible implementation, the processor is further configured to generate a fourth signaling message, where the fourth signaling message includes the gateway capability identifier; and the transmitter is further configured to send the fourth signaling message to the intermediate network element, so that the intermediate network element parses the fourth signaling message to obtain the gateway capability identifier, and generates and sends a first signaling message to the base station, where the first signaling message includes the gateway capability identifier.

According to a tenth aspect, an intermediate network element is provided, including: a receiver, configured to receive a second signaling message sent by a base station, where the second signaling message includes a base station capability identifier, and the base station capability identifier is a description of an EtoE QoS control capability of the base station; a processor, configured to parse the second signaling message to obtain the base station capability identifier; and generate a third signaling message, where the third signaling message includes the base station capability identifier; and a transmitter, configured to send the third signaling message to a gateway, so that the gateway parses the third signaling message to obtain the base station capability identifier.

With reference to the tenth aspect, in a first possible implementation, the receiver is further configured to receive a fourth signaling message sent by the gateway, where the fourth signaling message includes a gateway capability identifier, and the gateway capability identifier is a description of an EtoE QoS control capability of the gateway; the processor is further configured to parse the fourth signaling message to obtain the gateway capability identifier; and generate a first signaling message, where the first signaling message includes the gateway capability identifier; and the transmitter is further configured to send the first signaling message to the base station, so that the base station parses the first signaling message to obtain the gateway capability identifier.

According to an eleventh aspect, a capability negotiation system is provided, including: any base station according to the foregoing description; any gateway according to the foregoing description; and any intermediate network element according to the foregoing description.

In the capability negotiation method, system and apparatus provided in the embodiments of the present invention, when a gateway and a base station perform EtoE QoS control capability negotiation, the base station can receive and parse a gateway capability identifier sent by the gateway, and obtain an EtoE QoS control capability of the gateway by means of parsing, and finally can obtain the EtoE QoS control capability of the gateway; and when performing EtoE QoS control capability negotiation with the base station, the gateway can receive and parse a base station capability identifier sent by the base station, obtain an EtoE QoS control capability of the base station by means of parsing, and send a gateway capability identifier to the base station, so that the base station can obtain the EtoE QoS control capability of the gateway. Compared with the prior art, the flexibility of the EtoE QoS control capability negotiation performed between the base station and the gateway is improved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
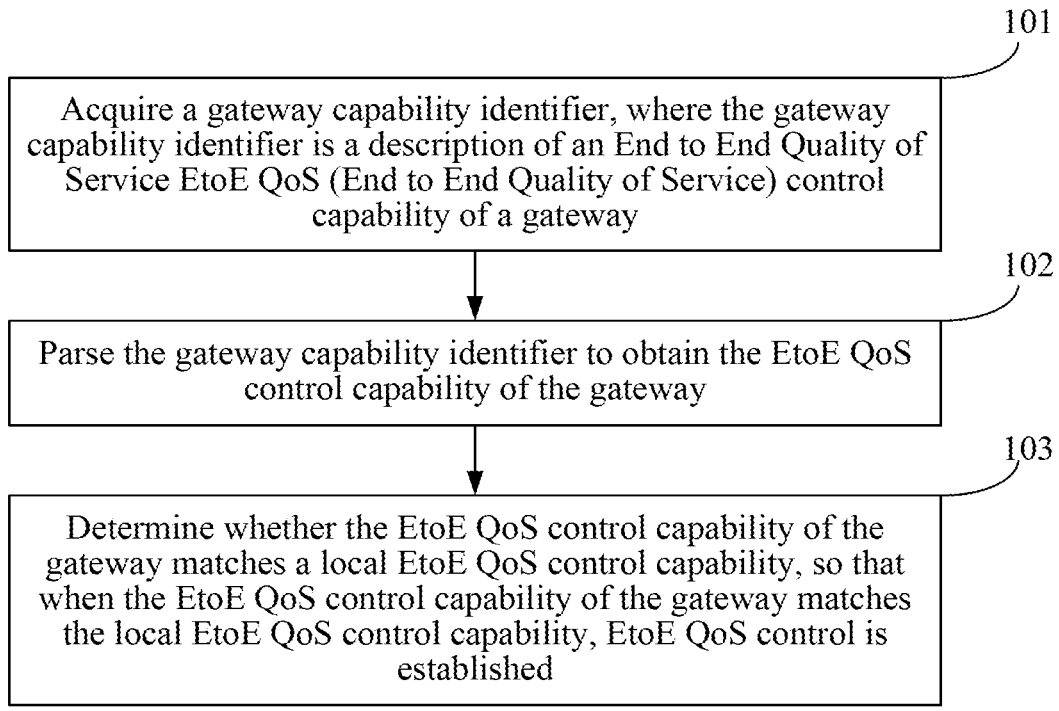
FIG. 1 is a flowchart of a capability negotiation method according to an embodiment of the present invention.

An embodiment of the present invention provides a capability negotiation method. The method is applied to a base station, and as shown in FIG. 1, includes the following steps:

Step 101. Acquire a gateway capability identifier, where the gateway capability identifier is a description of an end to end quality of service EtoE QoS control capability of a gateway.

Specifically, the gateway capability identifier may be acquired from a downlink data packet sent by the gateway, where the downlink data packet includes downlink data information of a user equipment accessing the base station and the gateway capability identifier, and the gateway capability identifier indicates the EtoE QoS control capability of the gateway. The gateway in this embodiment of the present invention refers to a GGSN or a PGW, and in an actual application, the gateway may also be another gateway device capable of completing EtoE QoS control together with the base station, which is not limited in this embodiment of the present invention. The gateway capability identifier may also be acquired from a first signaling message sent by an intermediate network element, where the intermediate network element refers to a relay transmission node between the base station and the gateway when a signaling message is transmitted, and the intermediate network element may be an MME (Mobility Management Entity, mobility management entity) or a serving gateway, or may be an SGSN (Serving General Packet Radio Service SUPPORT NODE, Serving General Packet Radio Service SUPPORT NODE), which is not limited in this embodiment of the present invention.

Exemplarily, in the case of acquiring the gateway capability identifier from a downlink data packet sent by the gateway, the base station first receives the downlink data packet sent by the gateway, where the downlink data packet includes the gateway capability identifier, and the base station can obtain the gateway capability identifier by parsing the downlink data packet.

In the case of acquiring the gateway capability identifier from a first signaling message sent by the intermediate network element, the base station first receives the first signaling message sent by the intermediate network element, where the first signaling message includes the gateway capability identifier, and the base station can obtain the gateway capability identifier by parsing the first signaling message. It should be noted that, the first signaling message is generated after the intermediate network element obtains the gateway capability identifier by parsing a fourth signaling message sent by the gateway.

Step 102. Parse the gateway capability identifier to obtain the EtoE QoS control capability of the gateway.

There are various types of EtoE QoS control, and when a type of EtoE QoS control is established, a corresponding gateway needs to have a corresponding capability. The EtoE QoS control capability of the gateway refers to a capability which a gateway possesses in completing EtoE QoS control. For example, if the gateway has a capability of cell congestion control, when the base station reports cell congestion information, the gateway or a PCRF (Policy and Charging Rule Function, Policy and Charging Rule Function) can specify, according to the reported information, a policy to relieve congestion, by allocating limited communications resources to a preset service preferentially, where the preset service may be a high-value service or a service used by a high-value user. In this way, utilization efficiency of the communications resources is improved. If the gateway has a capability of service flow priority control, it uses an FPI (service Flow Priority Identifier, service flow priority identifier) to denote a priority level of a service flow, and sends a downlink data packet carrying the FPI to the base station, so that the base station sends a downlink data packet of the service flow according to the FPI. By doing that, end to end quality of service control is implemented based on service flow, and different service processing may be applied to service flows, that is, differentiated service experience is provided for users of different categories and services of different types, thereby improving the utilization efficiency of the communications resources effectively.

After acquiring the gateway capability identifier from a downlink data packet sent by the gateway, the base station obtains the EtoE QoS control capability of the gateway by parsing the gateway capability identifier; or after acquiring the gateway capability identifier from a first signaling message sent by the intermediate network element, the base station obtains the EtoE QoS control capability of the gateway by parsing the gateway capability identifier.

Step 103. Determine whether the EtoE QoS control capability of the gateway matches a local EtoE QoS control capability, so that when the EtoE QoS control capability of the gateway matches the local EtoE QoS control capability, EtoE QoS control is established.

After obtaining the EtoE QoS control capability of the gateway, the base station needs to determine whether the EtoE QoS control capability of the gateway matches an EtoE QoS control capability of the base station. The matching of the capabilities refers to that both the base station and the gateway have a capability of establishing a type of EtoE QoS control. It is assumed that first EtoE QoS control needs to be established between the base station and the gateway, where the first EtoE QoS control is any EtoE QoS control among all types of EtoE QoS control. If the base station acquires the EtoE QoS control capability of the gateway by using the gateway capability identifier and determines that the gateway has a capability of establishing the first EtoE QoS control, and then determines, according to the EtoE QoS control capability of the base station, that the base station also has the first EtoE QoS control capability, the first EtoE QoS control may be established at two ends; and if the gateway does not have the capability of establishing the first EtoE QoS control, that is, the gateway does not support the first EtoE QoS control, after obtaining the EtoE QoS control capability of the gateway, the base station determines by analysis that the gateway does not have the capability of establishing the first EtoE QoS control, and the base station does not report information about the first EtoE QoS control to the gateway, thereby preventing the base station from carrying out fruitless operations and eliminating the compatibility problem that arises because the gateway is unable to recognize a data packet that is sent by the base station and carries the information about the first EtoE QoS control. In an actual application, the gateway capability identifier may also denote all types other than a particular type of EtoE QoS control capabilities of the gateway, and after acquiring the gateway capability identifier, the base station confirms that the gateway has all types of EtoE QoS control capabilities, that is, it is considered by default that the base station can establish any type of EtoE QoS control with the gateway.

In this way, when performing EtoE QoS control capability negotiation with the gateway, the base station can first acquire the EtoE QoS control capability of the gateway, and then determine whether the EtoE QoS control capability of the gateway matches the local EtoE QoS control capability of the base station. Compared with the prior art, the flexibility of the EtoE QoS control capability negotiation is improved.

Further, before step 101, the method further includes:

sending a base station capability identifier to the gateway, or sending the base station capability identifier to the intermediate network element, where the base station capability identifier is a description of an EtoE QoS control capability of the base station.

In the case that the base station capability identifier will be sent to the gateway, uplink data information sent by a user is received first, and an uplink data packet is generated according to the uplink data information and the EtoE QoS control capability of the base station, where the uplink data packet includes the base station capability identifier, and the base station capability identifier indicates the EtoE QoS control capability of the base station. Then the base station sends the uplink data packet to the gateway, and after receiving the uplink data packet, the gateway can obtain the base station capability identifier by parsing the uplink data packet.

In the case that the base station capability identifier is sent to the intermediate network element, a signaling message sent by a user is received first, and a second signaling message is generated according to the signaling message and the EtoE QoS control capability of the base station, where the second signaling message includes the base station capability identifier, and the base station capability identifier indicates the EtoE QoS control capability of the base station. Then the base station sends the second signaling message to the intermediate network element, and after receiving the second signaling message, the intermediate network element can obtain the base station capability identifier by parsing the second signaling message, so that the intermediate network element further generates a third signaling message and sends the third signaling message to the gateway, where the third signaling message includes the base station capability identifier.

Specifically, in the case that the base station acquires the gateway capability identifier by receiving a downlink data packet sent by the gateway, the gateway capability identifier may be identified by using an extension header of a GTP-U (General Packet Radio Service Tunnelling Protocol for the user plane, General Packet Radio Service Tunnelling Protocol for the user plane) header of the downlink data packet, and the base station obtains the gateway capability identifier by parsing the extension header of the GTP-U header of the downlink data packet. In the case that the base station acquires the gateway capability identifier by receiving a first signaling message sent by the intermediate network element, the gateway capability identifier may be added to a raw signaling message that needs to be sent by the intermediate network element to the base station, to generate the first signaling message, and the base station can obtain the gateway capability identifier by parsing the first signaling message.

Further, if a required EtoE QoS control has been established between the base station and the gateway, when the base station sends an uplink data packet to the gateway, the uplink data packet includes heartbeat information, where the heartbeat information refers to a state description of the EtoE QoS control capability of the base station that establishes the EtoE QoS control with the gateway. For example, when the user equipment accesses the base station, the base station and the gateway perform capability negotiation, and it is learned that the EtoE QoS control capability of the base station matches the EtoE QoS control capability of the gateway, and EtoE QoS control is established. Then an uplink data packet sent by the base station to the gateway carries heartbeat information, where the heartbeat information indicates to the gateway that the EtoE QoS control capability of the base station exists all the time, and the established EtoE QoS control may be continued. However, the base station may disable the EtoE QoS control capability of the base station due to some reason, and in this case, the uplink data packet sent to the gateway by the base station does not include the heartbeat information. After receiving the uplink data packet, the gateway parses no heartbeat information from the uplink data packet, and determines that the base station in this case does not have the EtoE QoS control capability, and may terminate the EtoE QoS control, thereby preventing performance degradation caused by fruitless operations of the gateway.

In the capability negotiation method provided in this embodiment of the present invention, when a base station and a gateway perform EtoE QoS control capability negotiation, the base station acquires a gateway capability identifier from a downlink data packet or a first signaling message, determines whether an EtoE QoS control capability of the gateway matches an EtoE QoS control capability of the base station, and sends a base station capability identifier by using an uplink data packet or a second signaling message, so that the gateway determines whether the EtoE QoS control capability of the base station matches the EtoE QoS control capability of the gateway. The EtoE QoS control is established when capabilities of the two parties are matched. Compared with the prior art, a process of the EtoE QoS control capability negotiation between the base station and the gateway exhibits higher flexibility.

Figure 2:
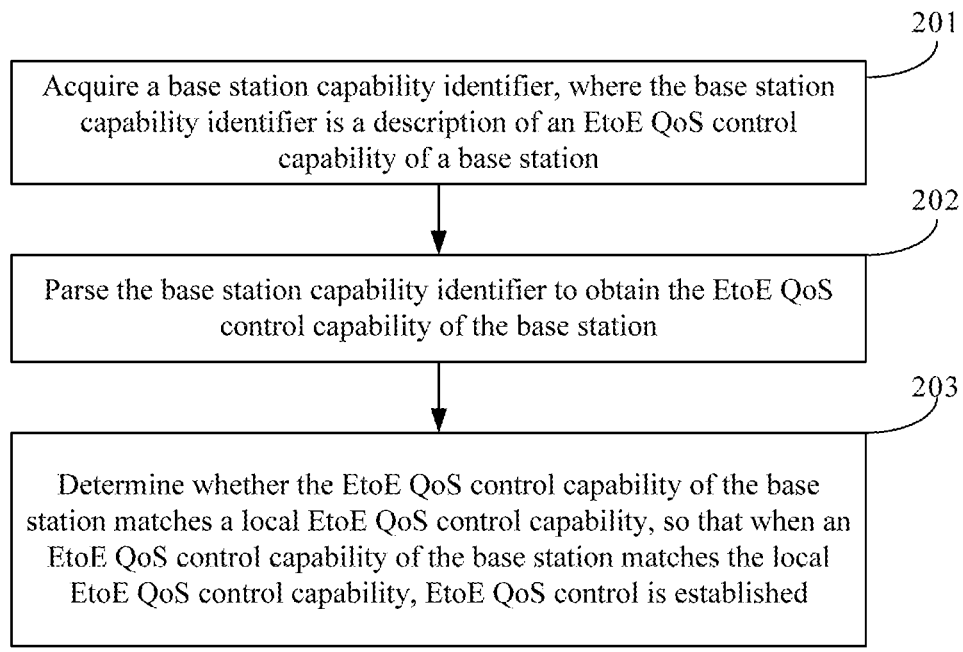
FIG. 2 is a flowchart of another capability negotiation method according to an embodiment of the present invention.

An embodiment of the present invention provides a capability negotiation method. The method is applied to a gateway, and as shown in FIG. 2, includes the following steps:

Step 201. Acquire a base station capability identifier, where the base station capability identifier is a description of an EtoE QoS control capability of a base station.

Specifically, the base station capability identifier may be acquired from an uplink data packet sent by the base station, where the uplink data packet also includes uplink data information of a user equipment accessing the base station; and may also be acquired from a third signaling message sent by an intermediate network element.

In the case of acquiring the base station capability identifier from an uplink data packet sent by the base station, the uplink data packet sent by the base station is received first, where the uplink data packet includes the base station capability identifier, and the base station capability identifier can be obtained by parsing the uplink data packet.

In the case of acquiring the base station capability identifier from a third signaling message sent by the intermediate network element, the third signaling message sent by the intermediate network element is received first, where the third signaling message includes the base station capability identifier, and the base station capability identifier can be obtained by parsing the third signaling message. It should be noted that, the third signaling message is generated after the intermediate network element obtains the base station capability identifier by parsing a second signaling message sent by the base station.

Step 202. Parse the base station capability identifier to obtain the EtoE QoS control capability of the base station.

The EtoE QoS control capability of the base station refers to a capability the base station possesses in completing EtoE QoS control. For example, if the gateway has a capability of cell congestion control, when the base station reports cell congestion information, the gateway or a PCRF can specify, according to the reported information, a policy to relieve congestion, by allocating limited communications resources to a preset service preferentially, where the preset service may be a high-value service or a service used by a high-value user. In this way, utilization efficiency of the communications resources is improved. If the gateway has a capability of service flow priority control, it uses an FPI to indicate a priority level of a service flow, and sends a downlink data packet carrying the FPI to the base station, so that the base station sends a downlink data packet of the service flow according to the FPI. By doing that, end to end quality of service control is implemented based on service flow, and different service processing may be applied to service flows, that is, differentiated service experience is provided for users of different categories and services of different types, thereby improving the utilization efficiency of the communications resources effectively.

After acquiring the base station capability identifier from an uplink data packet sent by the base station, the gateway obtains the EtoE QoS control capability of the base station by parsing the base station capability identifier; or after acquiring the base station capability identifier from a third signaling message sent by the intermediate network element, the gateway obtains the EtoE QoS control capability of the base station by parsing the base station capability identifier.

Step 203. Determine whether the EtoE QoS control capability of the base station matches a local EtoE QoS control capability, so that when an EtoE QoS control capability of the base station matches the local EtoE QoS control capability, EtoE QoS control is established.

After obtaining the EtoE QoS control capability of the base station, the gateway needs to determine whether the EtoE QoS control capability of the base station matches an EtoE QoS control capability of the gateway. The matching of the capabilities refers to that both the gateway and the base station have a capability of establishing a type of EtoE QoS control. It is assumed that first EtoE QoS control needs to be established between the base station and the gateway, where the first EtoE QoS control is any EtoE QoS control among all types of EtoE QoS control. If the gateway acquires the EtoE QoS control capability of the base station from the base station capability identifier, determines that the base station has a capability of establishing the first EtoE QoS control, and then determines, according to the EtoE QoS control capability of the gateway, that the gateway also has the first EtoE QoS control capability, the first EtoE QoS control may be established at two ends; and if the base station does not have the capability of establishing the first EtoE QoS control, that is, the base station does not support the first EtoE QoS control, after obtaining the EtoE QoS control capability of the base station, the gateway determines by analysis that the base station does not have the capability of establishing the first EtoE QoS control, and the gateway ascertains that it will not receive an uplink data packet that carries information about the first EtoE QoS control and is sent by the base station or a third signaling message that carries information about the first EtoE QoS control and is sent by the intermediate network element, thereby preventing performance degradation due to fruitless operations of the gateway. In an actual application, the base station capability identifier may indicate all types other than a particular type of EtoE QoS control capabilities of the base station, and after acquiring the base station capability identifier, the gateway ascertains that the base station has all types of EtoE QoS control capabilities, that is, it is considered by default that the gateway can establish any type of EtoE QoS control with the base station.

In this way, when performing EtoE QoS control capability negotiation with the base station, the gateway can first acquire the EtoE QoS control capability of the base station, and then determine whether the EtoE QoS control capability of the base station matches the local EtoE QoS control capability of the gateway. Compared with the prior art, the flexibility of the EtoE QoS control capability negotiation is improved.

Further, before step 201, the method further includes:
sending a gateway capability identifier to the base station, or sending the gateway capability identifier to an intermediate network element, where the gateway capability identifier is a description of an EtoE QoS control capability of the gateway.

In the case that the gateway capability identifier will be sent to the base station, downlink data information required by a user is acquired first, and a downlink data packet is generated according to the downlink data information and the EtoE QoS control capability of the gateway, where the downlink data packet includes the gateway capability identifier, and the gateway capability identifier indicates the EtoE QoS control capability of the gateway. Then the gateway sends the downlink data packet to the base station, and after receiving the downlink data packet, the base station may obtain the gateway capability identifier by parsing the downlink data packet.

In the case that the gateway capability identifier is sent to the intermediate network element, a signaling message required to be sent to the intermediate network element is acquired first, and a fourth signaling message is generated according to the signaling message and the EtoE QoS control capability of the gateway, where the fourth signaling message includes the gateway capability identifier, and the gateway capability identifier indicates the EtoE QoS control capability of the gateway. Then the gateway sends the fourth signaling message to the intermediate network element, and after receiving the fourth signaling message, the intermediate network element can obtain the gateway capability identifier by parsing the fourth signaling message, so that the intermediate network element further generates a first signaling message and sends the first signaling message to the base station, where the first signaling message includes the gateway capability identifier.

Specifically, in the case that the gateway acquires the base station capability identifier by receiving an uplink data packet sent by the base station, the base station capability identifier may be identified by using an extension header of a GTP-U header of the uplink data packet, and the gateway obtains the base station capability identifier by parsing the extension header of the GTP-U header of the uplink data packet. In the case that the gateway acquires the base station capability identifier by receiving a third signaling message sent by the intermediate network element, the base station capability identifier may be added to a raw signaling message that needs to be sent by the intermediate network element to the gateway, to generate the third signaling message, and the gateway can obtain the base station capability identifier by parsing the third signaling message.

Further, if a required EtoE QoS control has been established between the base station and the gateway, when the gateway receives an uplink data packet sent by the base station, the gateway may check whether if the uplink data packet includes heartbeat information. If yes, the gateway concludes that the EtoE QoS control capability exists all the time for the base station that establishes the EtoE QoS control with the gateway, and the established EtoE QoS control may be continued; and if the uplink data packet includes no heartbeat information, the gateway may determine accordingly that the base station in this case does not has the EtoE QoS control capability, and may terminate the EtoE QoS control, thereby preventing performance degradation caused by useless operation of the gateway.

In the capability negotiation method provided in this embodiment of the present invention, when a gateway and a base station perform EtoE QoS control capability negotiation, the gateway acquires a base station capability identifier from an uplink data packet or a third signaling message, determines whether an EtoE QoS control capability of the base station matches a local EtoE QoS control capability of the gateway, and sends a gateway capability identifier by using a downlink data packet or a fourth signaling message, so that the base station determines whether the EtoE QoS control capability of the gateway matches a local EtoE QoS control capability of the base station. The EtoE QoS control is established when capabilities of the two parties are matched. Compared with the prior art, the EtoE QoS control capability negotiation between the base station and the gateway exhibits higher flexibility.

Figure 3:
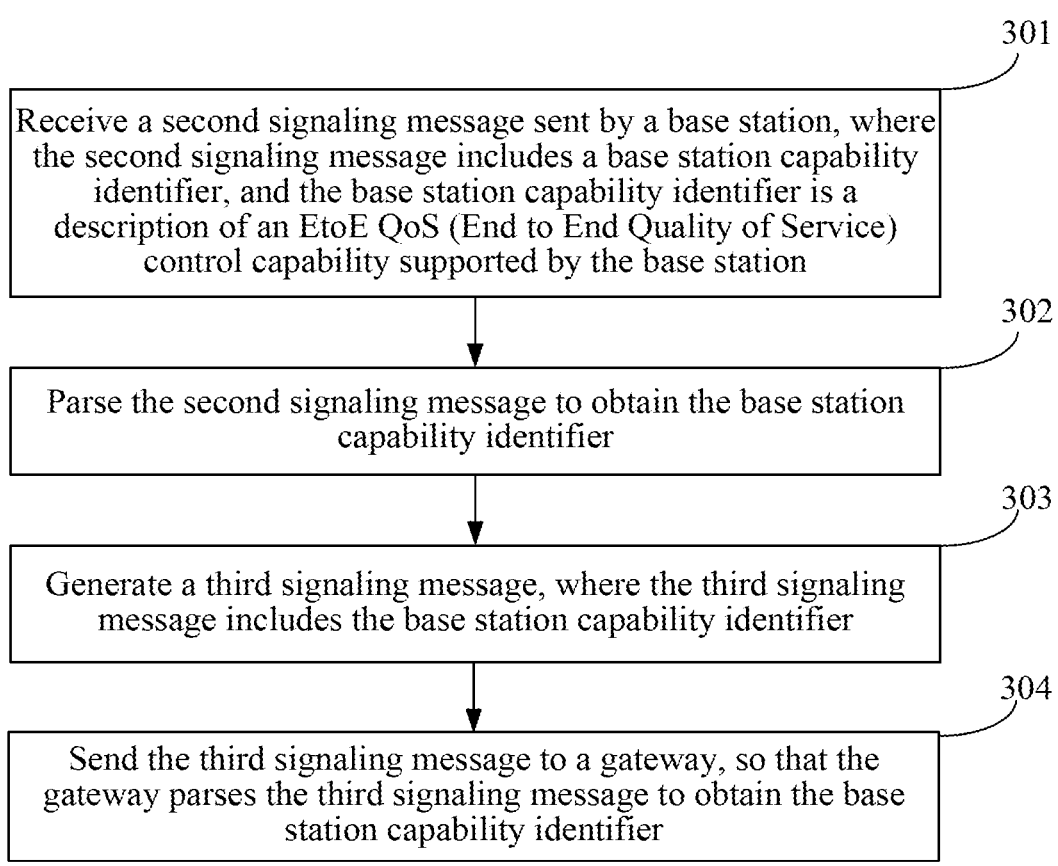
FIG. 3 is a flowchart of still another capability negotiation method according to an embodiment of the present invention.

An embodiment of the present invention provides a capability negotiation method. The method is applied to an intermediate network element, and as shown in FIG. 3, includes the following steps:

Step 301. Receive a second signaling message sent by a base station, where the second signaling message includes a base station capability identifier, and the base station capability identifier is a description of an EtoE QoS control capability of the base station.

Step 302. Parse the second signaling message to obtain the base station capability identifier.

After receiving the second signaling message sent by the base station, the intermediate network element may obtain the base station capability identifier by parsing the second signaling message, and the intermediate network element does not need to parse the base station capability identifier to obtain a specific EtoE QoS control capability of the base station.

In an actual application, the base station capability identifier may also be directly added to a signaling message sent by the base station to communicate location information to the intermediate network element. Therefore, the signaling message, which includes the base station capability identifier and is used by the base station to report location information, may be referred to as a second signaling message.

Step 303. Generate a third signaling message, where the third signaling message includes the base station capability identifier.

After obtaining the base station capability identifier by parsing the second signaling message, the intermediate network element generates a third signaling message, where the third signaling message includes the base station capability identifier. In an actual application, the base station capability identifier may be directly added to a signaling message sent by the intermediate network element to communicate location information to a gateway. Therefore, the signaling message, which includes the base station capability identifier and is used by the intermediate network element to report location information, may be referred to as a third signaling message.

Step 304. Send the third signaling message to a gateway, so that the gateway parses the third signaling message to obtain the base station capability identifier.

The intermediate network element sends the third signaling message that includes the base station capability identifier to the gateway, and in an actual application, the intermediate network element may directly send the signaling message which is indicative of location information and is added with the base station capability identifier to the gateway.

In this way, when the base station and the gateway perform capability negotiation by using signaling messages, the intermediate network element receives a second signaling message that carries the base station capability identifier and is sent by the base station, and then generates a third signaling message that carries the base station capability identifier and sends the third signaling message to the gateway, so that the gateway can obtain the base station capability identifier, and finally obtain the EtoE QoS control capability of the base station. Then, the gateway can determine whether the EtoE QoS control capability of the base station matches a local EtoE QoS control capability of the gateway. Compared with the prior art, the flexibility of the EtoE QoS control capability negotiation is improved.

Further, before step 301 or after step 304, the method further includes:

receiving a fourth signaling message sent by the gateway, where the fourth signaling message includes a gateway capability identifier, and the gateway capability identifier is a description of an EtoE QoS control capability of the gateway; parsing the fourth signaling message to obtain the gateway capability identifier; generating a first signaling message, where the first signaling message includes the gateway capability identifier; and sending the first signaling message to the base station, so that the base station parses the first signaling message to obtain the gateway capability identifier.

Specifically, after receiving the fourth signaling message, the intermediate network element may obtain the gateway capability identifier by parsing the fourth signaling message, and the intermediate network element does not need to parse the gateway capability identifier to obtain a specific EtoE QoS control capability of the gateway, but directly generates a first signaling message that includes the gateway capability identifier and sends the first signaling message to the base station, so that the base station determines the EtoE QoS control capability of the gateway. It should be noted that, when the first signaling message is generated, the gateway capability identifier may be directly added to a signaling message that needs to be sent by the intermediate network element to the base station and then be sent, and therefore, the signaling message that is added with the gateway capability identifier may be referred to as a first signaling message.

In the capability negotiation method provided in this embodiment of the present invention, when a gateway and a base station perform EtoE QoS control capability negotiation by using signaling messages, an intermediate network element receives and parses a second signaling message that includes a base station capability identifier and is sent by the base station, to obtain the base station capability identifier, and then generates a third signaling message that includes the base station capability identifier and sends the third signaling message to the gateway, so that the gateway can obtain an EtoE QoS control capability of the base station; and the intermediate network element receives and parses a fourth signaling message that includes a gateway capability identifier and is sent by the gateway, to obtain the gateway capability identifier, and generates a first signaling message that includes the gateway capability identifier and sends the first signaling message to the base station, so that the base station can obtain an EtoE QoS control capability of the gateway. Compared with the prior art, the EtoE QoS control capability negotiation between the base station and the gateway exhibits higher flexibility.

When the base station and the gateway acquire each other's capability identifier by receiving a data packet from each other, if a GTP (General Packet Radio Service Tunnelling Protocol, General Packet Radio Service Tunnelling Protocol) interface is used between the base station and the gateway, the base station/gateway capability identifier may be carried in an extension header of a GTP-U header of an uplink/downlink data packet. Exemplarily, the data packet includes a GTP-U header, and a specific structure of the GTP-U header is shown in Table 1. Table 1 presents a type or specific meaning of information in each byte of a complete GTP-U header.

TABLE 1

Information Element Identifier of GTP-U Header

| Version (version information) | PT (protocol type) | (*) | E (extension header identifier) | S (sequence number identifier) | PN (network protocol data unit number identifier) |
|---|---|---|---|---|---|

Message Type (message type)
Length (1st Octet) (length)
Length (2nd Octet) (length)
Tunnelling Endpoint Identifier (1st Octet) (tunnelling endpoint identifier)
Tunnelling Endpoint Identifier (2nd Octet) (tunnelling endpoint identifier)
Tunnelling Endpoint Identifier (3rd Octet) (tunnelling endpoint identifier)
Tunnelling Endpoint Identifier (4th Octet) (tunnelling endpoint identifier)
Sequence Number (1st Octet)1) 4) (sequence number)
Sequence Number (2nd Octet)1) 4) (sequence number)
N-PDU Number 2) 4) (layer-n protocol data unit number)
Next Extension Header Type 3) 4) (next extension header type)

Exemplarily, it can be seen from Table 1 that, the last byte of the GTP-U header describes a type of an extension header of a GTP-U header, and represents that bytes closely following the byte are an extension header part of the GTP-U header, and the type of the extension header is defined by the byte, where the byte is a unit of measurement for measuring storage capacity and transmission capacity in a computer information technology, one byte is equal to an 8-bit binary number, and one byte occupies two characters. A $7^{th}$ bit and an $8^{th}$ bit of the byte are filled with different numbers, which represent a processing requirement for an intermediate network element and a terminating network element through which a packet passes in a transmission process. In this embodiment, the terminating network element is the gateway. When 0 is written to the $7^{th}$ bit of the byte, and 0 is written to the $8^{th}$ bit of the byte, it indicates that the intermediate network element and the terminating network element may not interpret the meaning of the extension header, but the intermediate network element should forward the extension header to the terminating network element; when 1 is written to the $7^{th}$ bit of the byte, and 0 is written to the $8^{th}$ bit of the byte, it indicates that the intermediate network element needs to discard the extension header; when 0 is written to the $7^{th}$ bit of the byte, and 1 is written to the $8^{th}$ bit of the byte, it indicates that the terminating network element needs to interpret the extension header, and the intermediate network element may not interpret the extension header but needs to forward the extension header to the terminating network element; and when 1 is written to the $7^{th}$ bit of the byte, and 1 is written to the $8^{th}$ bit of the byte, it indicates that both the intermediate network element and the terminating network element need to interpret the meaning of the extension header. Because different numbers written to the byte represent different types of extension headers, an exclusive extension header may be defined according to the existing protocol, where the exclusive extension header may carry a base station capability identifier in uplink, and carry a gateway capability identifier in downlink. In an actual application, incompatibility between devices may cause the terminating network element to be unable to interpret the extension header where 0 is written to the $7^{th}$ bit and 1 is written to the $8^{th}$ bit, and in this case, an extension header where 0 is written to the $7^{th}$ bit and 0 is written to the $8^{th}$ bit may also be used to carry required information, providing that a particular protocol exists between target network elements to allow the terminating network element to interpret the protocol-defined extension header where 0 is written to the $7^{th}$ bit and 0 is written to the $8^{th}$ bit, and can obtain the required information by means of parsing. For example, when 0011 0000 is written to a byte of a GTP-U header of a data packet, it indicates that an extension header defined by the byte is a first extension header. In an actual application, a length of the first extension header and the number of extension subheaders included in the first extension header may be configured, and a gateway capability identifier may further be carried by configuring a type of an extension subheader and filling in content of the extension subheader; the first extension header is carried in both uplink and downlink, but the content part of the first extension headers in uplink and downlink may include different information.

After the type of the extension header of GTP-U is defined, information carried by the extension header may be described by using a protocol which defines the extension header. The extension header may include multiple bytes, and each byte may carry different content as defined by a protocol. An extension header may also include multiple extension subheaders therein, which are used for describing different information, and a format definition of the extension header is shown in Table 2.

TABLE 2

| Format Definition of Extension Header of GTP-U | |
|---|---|
| Length (length) | |
| Spare (spare) | Next Extension subheader Type (next extension subheader type) |
| Extension subheader Content (extension subheader content) | |
| . . . | |
| Extension subheader Content (extension subheader content) | |
| Next Extension Header Type (next extension header type) | |

Table 2 presents a type or specific meaning of information in a complete extension header of GTP-U. Exemplarily, it can be learned from Table 2 that, a first byte of the extension header describes an overall length of the extension header, and in compliance with the 3GPP protocol, the length needs to be an integral multiple of 4. If content of the extension header merely occupies some of the bytes occupied by "length", 0s are added to a spare byte to make a length of the content of the extension header equal to the length denoted by "length"; the first 4 bits of the second byte are identified as being spare and have no specific meaning, and 0 is always written to the first 4 bits of the second byte; the last 4 bits represent the type of the first extension subheader included in the extension header. If the extension header does not include any extension subheader, this part is filled with 0; bytes starting from the third byte represent content of the extension subheader, and this part may include multiple extension subheaders, where the specific number of extension subheaders is determined according to content that needs to be identified in an actual application. If the extension header does not include any extension subheader, content of the extension header may be directly written to this part. If the GTP-U header further includes a second extension header subsequent to the first extension header, the last byte of the first extension header describes a type of the next extension header.

An extension subheader may also include multiple bytes, and in an actual application, the specific number of bytes is determined according to content that needs to be carried by the extension subheader. A definition of an extension subheader is shown in Table 3. Table 3 presents a type or specific meaning of information in each byte of an extension subheader of an extension header in a complete GTP-U header.

TABLE 3

| Format Definition of Extension Subheader of Extension Header in GTP-U Header | |
|---|---|
| Extension subheader Length (extension subheader length) | Next Extension subheader Type (next extension subheader type) |
| Extension subheader Content (extension subheader content) | |
| ... | |
| Extension subheader Content (extension subheader content) | |

Exemplarily, it can be learned from Table 3 that, the first 4 bits of the first byte of an extension subheader identify a length of the extension subheader, and the last 4 bits identify a type of a next extension subheader; and the second byte to the last byte of the extension subheader describe content of the extension subheader, and may include protocol version information, an indication to a next network element, and the like.

It is assumed that 0011 0000 is written to the last byte of a GTP-U header included in a data packet, that is, it is defined that the first extension header is an extension header that can describe an EtoE QoS control capability of a gateway or a base station. Table 4 shows the type of an extension subheader that may be included in the last 4 bits of the second byte of the first extension header, that is, in the part that defines the type of a next extension subheader. In Table 4, the type of the extension subheader represents different possible types classified according to different information carried by the extension subheader, the type of the extension subheader is identified by the last 4 bits of the second byte of the extension header, and a corresponding numeral is written to represent the type of the next extension subheader. The direction in Table 4 represents whether the extension subheader appears when a base station sends an uplink data packet to a gateway or when a gateway sends a downlink data packet to a base station. The information content in Table 4 represents a specific type of a next extension subheader indicated when the last 4 bits of the second byte of the extension header are filled with different numbers.

TABLE 4

| Type Definition of Extension Subheader of Extension Header in GTP-U Header | | |
|---|---|---|
| Extension subheader type | Direction | Information content |
| 0 | Uplink/downlink | Indicating that no more extension subheaders exist |
| 1 | Uplink | Indicating that a next extension subheader carries base station capability information, including version information |
| 2 | Uplink | Indicating that a next extension subheader carries 2G/3G cell load information, including a cell identifier, a session identifier and a cell load level |
| 3 | Uplink | Indicating a next extension subheader carries 4G cell load information, including a cell identifier, a session identifier and a cell load level |
| 4 | Uplink | Indicating that a next extension subheader carries a heartbeat message of a base station |
| 5-7 | — | Reserved (reserved) |
| 8 | Downlink | Indicating that a next extension subheader carries gateway capability information, including version information |
| 9 | Downlink | Indicating that a next extension subheader carries a service priority identifier FPI |
| 10-15 | — | Reserved (reserved) |

Exemplarily, if the data packet is an uplink data packet, a base station capability identifier needs to be carried, and according to the content in Table 4, 1 is written to the last 4 bits of the second byte of the first extension header, which represents that the first extension subheader included in the first extension header is a first extension subheader, and the first extension subheader is an extension subheader that carries the base station capability identifier. A format definition of the first extension subheader is shown in Table 5.

TABLE 5

| Format Definition of Capability Information | |
|---|---|
| Extension subheader Length (length of an extension subheader) | Next Extension subheader Type (type of a next extension subheader) |
| Spare (spare) | Version (version information) |
| Description of Capability (capability identifier) | |

Table 5 presents a format definition of an extension subheader that carries a capability identifier and protocol version information. Specifically, it can be seen from Table 5 that, the first 4 bits of the first byte of the first extension subheader identify a length of the extension subheader, which is determined according to an actual length of the first extension subheader in an actual application; and the last 4 bits are a type of a next extension subheader, and are filled according to a requirement of an actual application and Table 4. The first 4 bits of the second byte are spare, and are generally filled with 0s all the time, or may be filled with other information according to an actual situation, and the last 4 bits are protocol version information. If the last 4 bits are filled with 0s, it indicates that a current version is used for capability negotiation. Bytes from the third byte to the last byte of the first extension subheader are used to describe information about an EtoE QoS control capability of a base station. Because there are many types of EtoE QoS control, a base station may have many types of EtoE QoS control capabilities. It is assumed that the third byte of the first extension subheader is used to describe an EtoE QoS control capability of a base station; when a communications system is initialized, an EtoE QoS control capability with which the base station may be involved may correspond to the third byte of the first extension subheader. Each digit in 8 binary digits included in the byte corresponds to one capability; if a digit is filled with "0", it indicates that the base station does not have an EtoE QoS control capability corresponding to the digit, and if the digit is filled with "1", it indicates that the base station has an EtoE QoS control capability corresponding to the digit. The byte can identify at most 8 EtoE QoS control capabilities of the base station, and if the base station has more than 8 EtoE QoS control capabilities, the fourth byte may be used for description. There are many coding methods for EtoE QoS control capabilities of a base station, and this embodiment of the present invention merely uses one coding method as an example for explanation. In an actual application, two extension subheaders may also be used to carry protocol version information and a base station capability identifier separately. For example, the first 4 bits of the first byte of an extension subheader that carries a base station capability identifier identify a length of the extension subheader, and the last 4 bits identify a type of a next extension subheader. Bytes from the second byte to the last byte of the extension subheader are used to describe information about an EtoE QoS control capability of a base station. When the base station capability identifier denotes all types other than a particular type of EtoE QoS control capabilities of the base station, the third byte of the first extension subheader may be filled with a preset symbol or the first extension subheader only has the first two bytes, and it indicates that the base station has all types of EtoE QoS control capabilities, that is, it is considered by default that the gateway can establish any type of EtoE QoS control with the base station. In an actual application, a specific solution is selected according to a specific situation, which is not limited in this embodiment of the present invention.

After the base station and the gateway complete capability negotiation, and required first EtoE QoS control is established, the base station further needs to add heartbeat information to an uplink data packet. When the first extension header carries no capability identifier but carries heartbeat information, the last 4 bits of the second byte of the first extension header are filled with 4, which indicates that the first extension subheader of the first extension header is a third extension subheader that carries the heartbeat information; the third extension subheader has a length of 1, and includes no specific content. A specific format definition thereof is shown in Table 6. Table 6 records a specific format of an extension subheader that carries heartbeat information.

TABLE 6

Format Definition of Heartbeat Information

| Extension subheader Length (extension subheader length) | Next Extension subheader Type (next extension subheader type) |
|---|---|

It can be learned from Table 6 that, the third extension subheader has only one byte, the first 4 bits of the byte identify a length of the third extension subheader, and the length is 1; and the last 4 bits identify a type of a next extension subheader, and are filled according to a requirement of an actual application and Table 4.

If the data packet is a downlink data packet, a gateway capability identifier needs to be carried, and according to the content in Table 4, 8 is written to the last 4 bits of the second byte of the first extension header, which represents that the first extension subheader included in the first extension header is a second extension subheader, and the second extension subheader carries the gateway capability identifier. A format definition of the second extension subheader is the same as that of the first extension subheader. As shown in Table 5, bytes from the third byte of the second extension subheader to the last byte of the second extension subheader are used to describe information about an EtoE QoS control capability of a gateway. Because there are many types of EtoE QoS control, a gateway may have many types of EtoE QoS control capabilities. It is assumed that the third byte of the second extension subheader is used to describe an EtoE QoS control capability of a gateway; when a communications system is initialized, an EtoE QoS control capability with which the gateway may be involved may correspond to the third byte of the second extension subheader. Each digit in 8 binary digits included in the byte corresponds to one capability; if a digit is filled with "0", it indicates that the gateway does not have an EtoE QoS control capability corresponding to the digit, and if the digit is filled with "1", it indicates that the gateway has an EtoE QoS control capability corresponding to the digit. The byte can identify at most 8 EtoE QoS control capabilities of the gateway, and if the gateway has more than 8 EtoE QoS control capabilities, the fourth byte may be used for description. There are many coding methods for EtoE QoS control capabilities that a gateway has, and this embodiment of the present invention merely uses one coding method as an example for explanation. In an actual application, two extension subheaders may also be used to carry protocol version information and a gateway capability identifier separately. For example, the first 4 bits of the first byte of an extension subheader that carries a gateway capability identifier identify a length of the extension subheader, and the last 4 bits identify a type of a next extension subheader. Bytes from the second byte to the last byte of the extension subheader are used to describe information about an EtoE QoS control capability of a gateway. When the gateway capability identifier denotes all types other than a particular type of EtoE QoS control capabilities of the gateway, the third byte of the first extension subheader may be filled with a preset symbol or the first extension subheader only has the first two bytes, and it indicates that the gateway has all types of EtoE QoS control capabilities, that is, it is considered by default that the base station can establish any type of EtoE QoS control with the gateway. In an actual application, a specific solution is selected according to a specific situation, which is not limited in this embodiment of the present invention.

When the base station and the gateway acquire each other's capability identifier by receiving a data packet from each other, if a PMIPv6 (Proxy Mobile Internet Protocol version 6, Proxy Mobile Internet Protocol version 6) interface is used between the base station and the gateway, the base station/gateway capability identifier may be carried in a GRE (General Packet Radio Service, general packet radio service) encapsulation of an uplink/downlink data packet, where a field is added to carry a capability identifier and heartbeat information, a specific format definition is shown in Table 7.

TABLE 7

Format Definition of GRE Encapsulation

| C | K | S | Reserved 0 (reserved field 0) | Ver (version information) | Protocol Type (protocol type) |
|---|---|---|---|---|---|
| | | | Checksum (checksum) | | Reserved 1 (reserved field 1) |
| | | | Key (key) | | |
| | | | Sequence Number (sequence number) | | |
| | | | Description of Capability (capability identifier) or Heartbeat information (heartbeat information) | | |

Table 7 presents a specific format of one GRE encapsulation. It can be seen from Table 7 that, one GRE encapsulation includes a reserved field 0, a reserved field 1, a protocol type, a checksum, a key, a sequence number, and a capability identifier or heartbeat information, where the reserved field 1, the checksum, the key and the sequence number are optional, and may be carried or not carried in the GRE encapsulation; the capability identifier or the heartbeat information is carried by one information element added to the original GRE encapsulation, and may include multiple fields. When a base station and a gateway perform capability negotiation, the field is used to identify an EtoE QoS control capability of the base station/gateway, and after the base station and the gateway complete the capability negotiation and EtoE QoS control is established, the information element may be used to carry the heartbeat information. In an actual application, the capability identifier and the heartbeat information may also be carried without adding one information element, and they are directly identified by using the reserved field 0 (Reserved 0) and the reserved field 1 (Reserved 1) in the GRE encapsulation in the prior art.

Figure 4A:
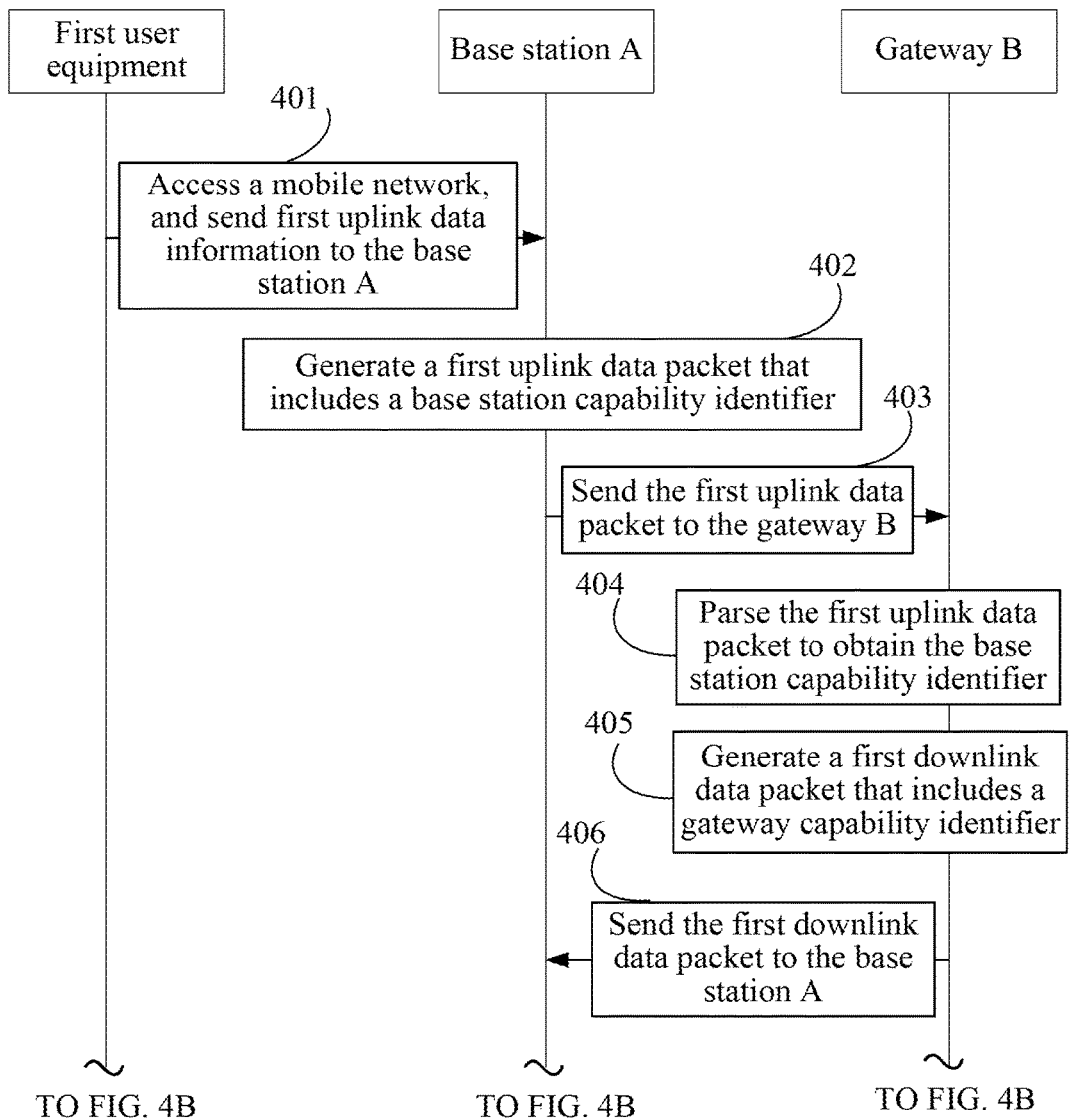
FIGS. 4A and 4B are a flowchart of still another capability negotiation method according to an embodiment of the present invention.
Figure 4B:
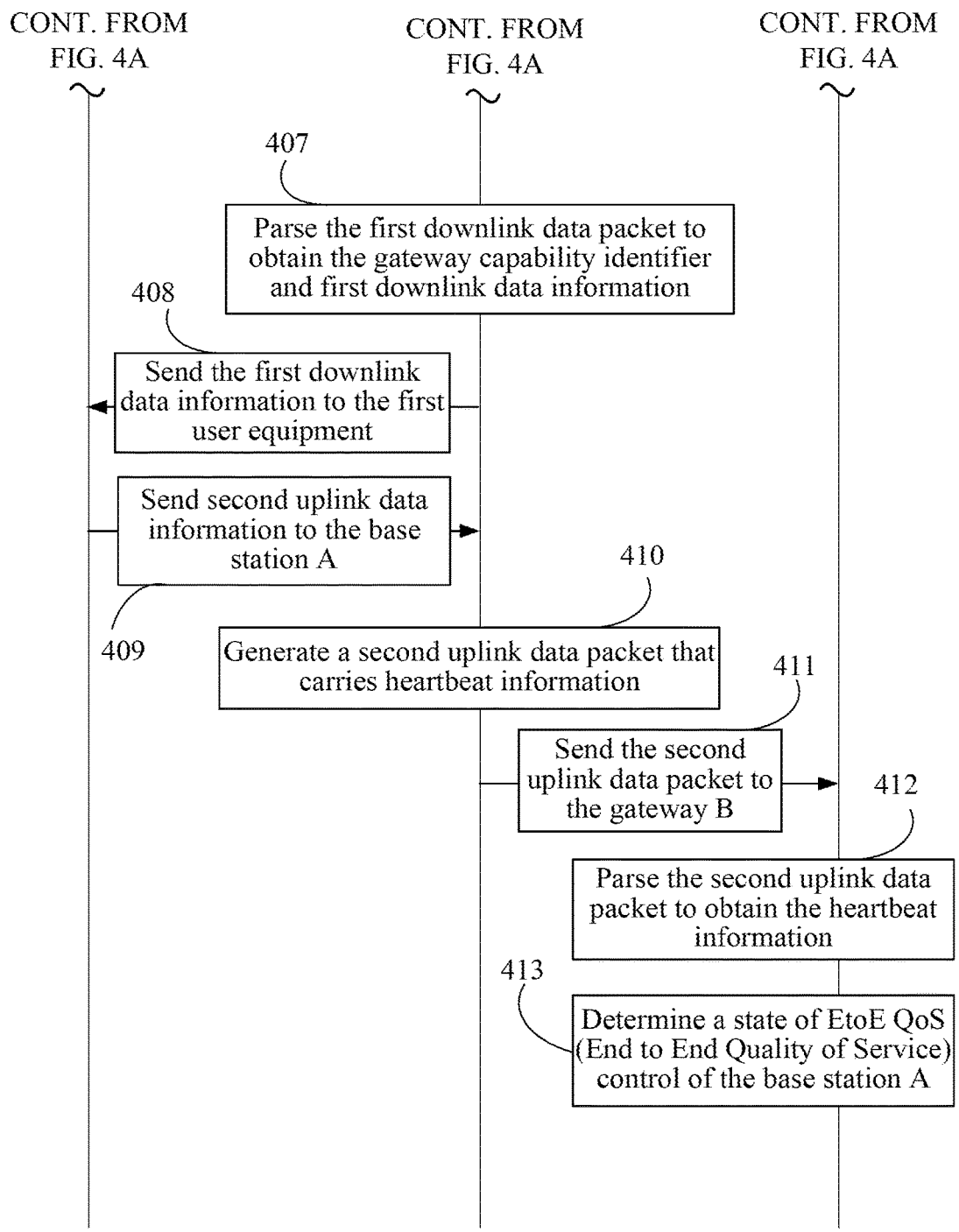

An embodiment of the present invention provides a capability negotiation method. As shown in FIG. 4A and FIG. 4B, a first user equipment, a base station A and a gateway B are used as examples for description. The base station A is a base station serving a current cell in which the first user equipment is located, and the gateway B is a gateway corresponding to the base station A.

Step 401. The first user equipment accesses a mobile network, and sends first uplink data information to the base station A.

The first user equipment accesses the mobile network to perform a data transmission service, that is, establishes a PDN (Packet Data Network, packet data network) connection to the gateway through the base station A. If the first user equipment accesses a GPRS (General Packet Radio Service, General Packet Radio Service) network, a PDP (Packet Data Protocol, Packet Data Protocol) channel is established in the network; and if the first user equipment accesses an EPS (Evolved Packet System, Evolved Packet Service) network, a bearer channel is established in the network.

When performing a data transmission service with aid of the base station A, the first user equipment first sends the first uplink data information to the base station A.

Step 402. The base station A generates a first uplink data packet that includes a base station capability identifier.

After the first uplink data information sent by the first user equipment is received, a first uplink data packet is generated, where the first uplink data packet includes a GTP-U header. The base station A fills 0011 0000 in the $12^{th}$ byte of the GTP-U header of the first uplink data packet, to indicate that an extension header of the GTP-U header is a first extension header that carries a capability identifier, and then fills in the last 4 bits of the second byte of the first extension header by 1s, to indicate that the initial extension subheader of the first extension header is a first extension subheader that carries a base station capability identifier. It is assumed that cell congestion control needs to be established between the base station A and the gateway B, and a capability of cell congestion control corresponds to a first digit of the third byte of the first extension subheader; if the base station A determines that the base station A has the capability of cell congestion control, the base station A writes 0000 0001 to the third byte of the first extension subheader, to indicate that the base station A has the capability of cell congestion control.

Step 403. The base station A sends the first uplink data packet to the gateway B.

Step 404. The gateway B parses the first uplink data packet to obtain the base station capability identifier.

After receiving the first uplink data packet, the gateway B parses the first uplink data packet, and performs subsequent processing on the obtained first uplink data information; the gateway B parses the obtained extension header of the GTP-U header: the gateway B first determines, according to the information 0011 0000 in the $12^{th}$ byte of the GTP-U header, that the extension header of the GTP-U header of the first uplink data packet is a first extension header that carries a capability identifier, then determines, according to the information 1 in the second byte of the first extension header, that the first extension subheader carries the base station capability identifier, and determines, according to the information 0000 0001 in the third byte of the first extension subheader, that the base station A has the capability of cell congestion control. After learning that the base station A has the capability of cell congestion control, the gateway B determines that the gateway B also has the capability of cell congestion control and can establish cell congestion control with the base station A. Afterwards, the gateway B stores the capability of the cell congestion control of the base station A locally.

Step 405. The gateway B generates a first downlink data packet that includes a gateway capability identifier.

After obtaining first downlink data information required by the first user equipment, the gateway B generates a first downlink data packet, where the downlink data packet includes a GTP-U header. The gateway B fills 0011 0000 in the $12^{th}$ byte of the GTP-U header of the first downlink data packet, to indicate that an extension header of the GTP-U header is a first extension header that carries a capability identifier, then fills 8 in the last 4 bits of the second byte of the first extension header, to indicate that the initial extension subheader of the first extension header is a second extension subheader that carries a gateway capability identifier, and writes 0000 0001 to the third byte of the first extension subheader of the gateway B, to indicate that the gateway B has the capability of cell congestion control.

Step 406. The gateway B sends the first downlink data packet to the base station A.

Step 407. The base station A parses the first downlink data packet to obtain the gateway capability identifier and the first downlink data information.

After receiving the first downlink data packet, the base station A parses the first downlink data packet, and retains the obtained first downlink data information so as to send the first downlink data information to the first user equipment subsequently; and the base station A parses the obtained extension header of the GTP-U header: first, the base station A determines, according to the information 0011 0000 in the $12^{th}$ byte of the GTP-U header, that the extension header of the GTP-U header of the first downlink data packet is a first extension header that carries a capability identifier, then determines, according to the information in the second byte of the first extension header, that the first extension subheader carries the gateway capability identifier, and determines, according to the information 0000 0001 in the third byte of the first extension subheader, that the gateway B has the capability of cell congestion control. After capability negotiation, the base station A and the gateway B confirm with each other that the other party has the required capability of cell congestion control, and then establish cell congestion control for the first user equipment.

Step 408. The base station A sends the first downlink data information to the first user equipment.

The first downlink data information retained in step 407 is sent to the first user equipment, and step 408 may be performed simultaneously with the downlink capability negotiation process between the base station A and the gateway B in step 407.

Step 409. The first user equipment sends second uplink data information to the base station A.

The first user equipment sends the second uplink data information to the base station A according to the first downlink data information and a demand of the first user equipment.

Step 410. The base station A generates a second uplink data packet that carries heartbeat information.

After receiving the second uplink data information sent by the first user equipment, the base station A generates a second uplink data packet, where the uplink data packet still includes a GTP-U header. If the base station A has the capability of cell congestion control all the time, the base station A fills 4 in the last 4 bits of the second byte of the first extension header, which indicates that the initial extension subheader of the first extension header is a third extension subheader that carries heartbeat information; and if the base station A no longer has the capability of cell congestion control after a time point C, the first extension header of the GTP-U header of the first uplink data packet after the time point C does not include the third extension subheader, which indicates that the base station A no longer has the capability of cell congestion control.

Step 411. The base station A sends the second uplink data packet to the gateway B.

Step 412. The gateway B parses the second uplink data packet to obtain the heartbeat information.

After receiving the second uplink data packet, the gateway B parses the second uplink data packet, and performs subsequent processing on the obtained second uplink data information; the gateway B parses the obtained extension header of the GTP-U header: the gateway B determines, according to the information 4 of the last 4 bits of the second byte of the first extension header of the GTP-U header, that the first extension subheader of the first extension header is a third extension subheader.

Step 413. The gateway B determines a EtoE QoS control state of the base station A.

If the first extension header of the GTP-U header of the second uplink data packet includes a third extension subheader, it indicates that the second uplink data packet carries heartbeat information, and the gateway B determines, according to the heartbeat information, that the base station A has the capability of cell congestion control all the time, and continues to perform cell congestion control; and if the extension header of the GTP-U header does not include a third extension subheader, it indicates that the second uplink data packet carries no heartbeat information, and the gateway B determines that the base station A no longer has the capability of cell congestion control, and terminates the cell congestion control, thereby preventing the gateway B from carrying out fruitless operations.

It should be noted that, the sequence of the steps of the capability negotiation method provided in this embodiment of the present invention may be adjusted to a certain extent, and steps may also be added or deleted according to circumstances. Any variation that can be readily figured out by a person skilled in the art within the technical scope disclosed in the present invention shall fall within the protection scope of the present invention, and therefore is not described again.

In the capability negotiation method provided in this embodiment of the present invention, when a base station and a gateway perform EtoE QoS control capability negotiation, the base station acquires a gateway capability identifier from an extension header of a GTP-U header of a downlink data packet, determines whether the gateway has a required EtoE QoS control capability, and then sends a base station capability identifier by using an extension header of a GTP-U header of an uplink data packet; and the gateway determines, according to the extension header of the GTP-U header of the uplink data packet sent by the base station, whether the base station has the required EtoE QoS control capability. The EtoE QoS control is established when both parties have the required EtoE QoS control capability. Compared with the prior art, a process of the EtoE QoS control capability negotiation between the base station and the gateway exhibits higher flexibility.

Figure 5A:
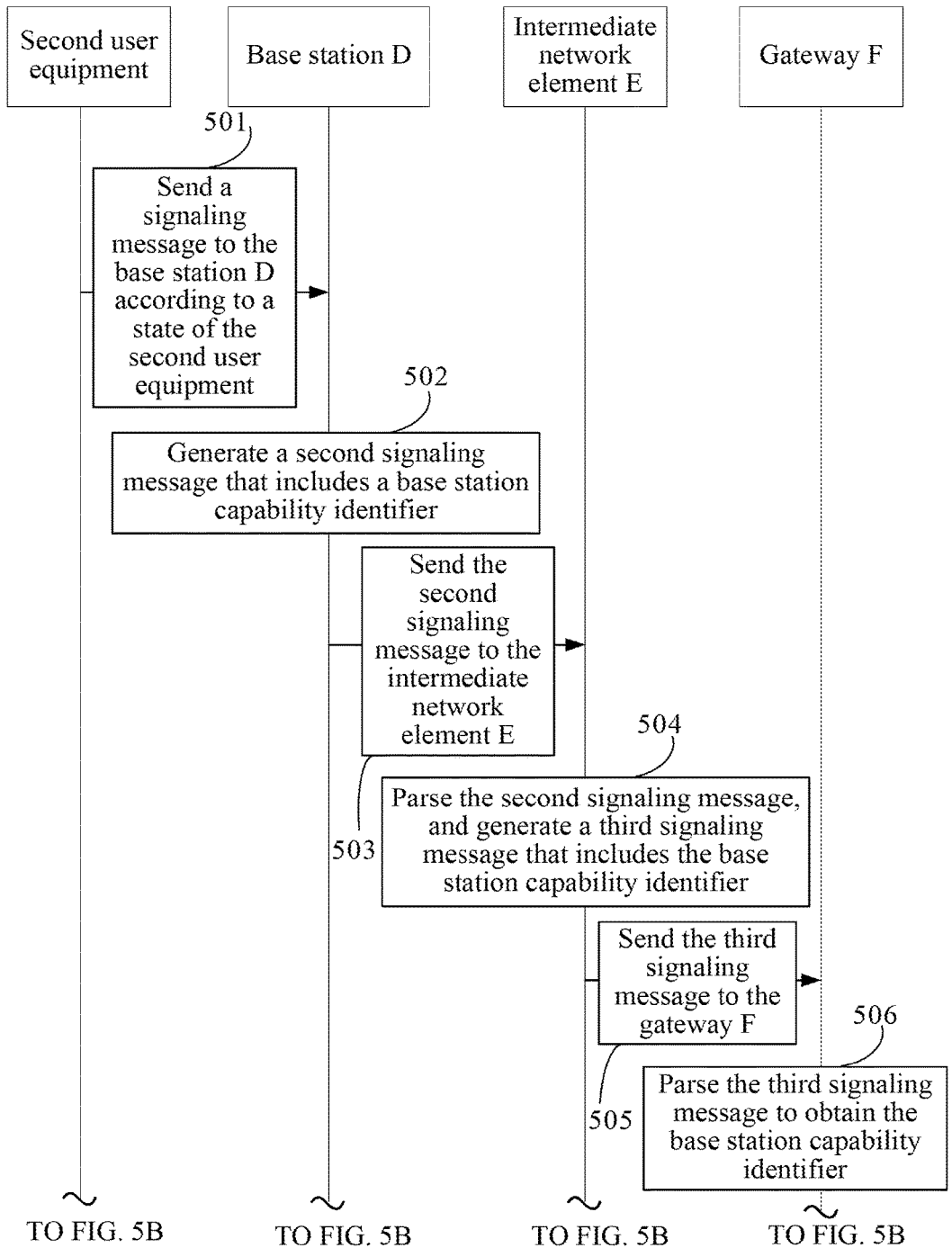
FIGS. 5A and 5B are a flowchart of still another capability negotiation method according to an embodiment of the present invention.
Figure 5B:
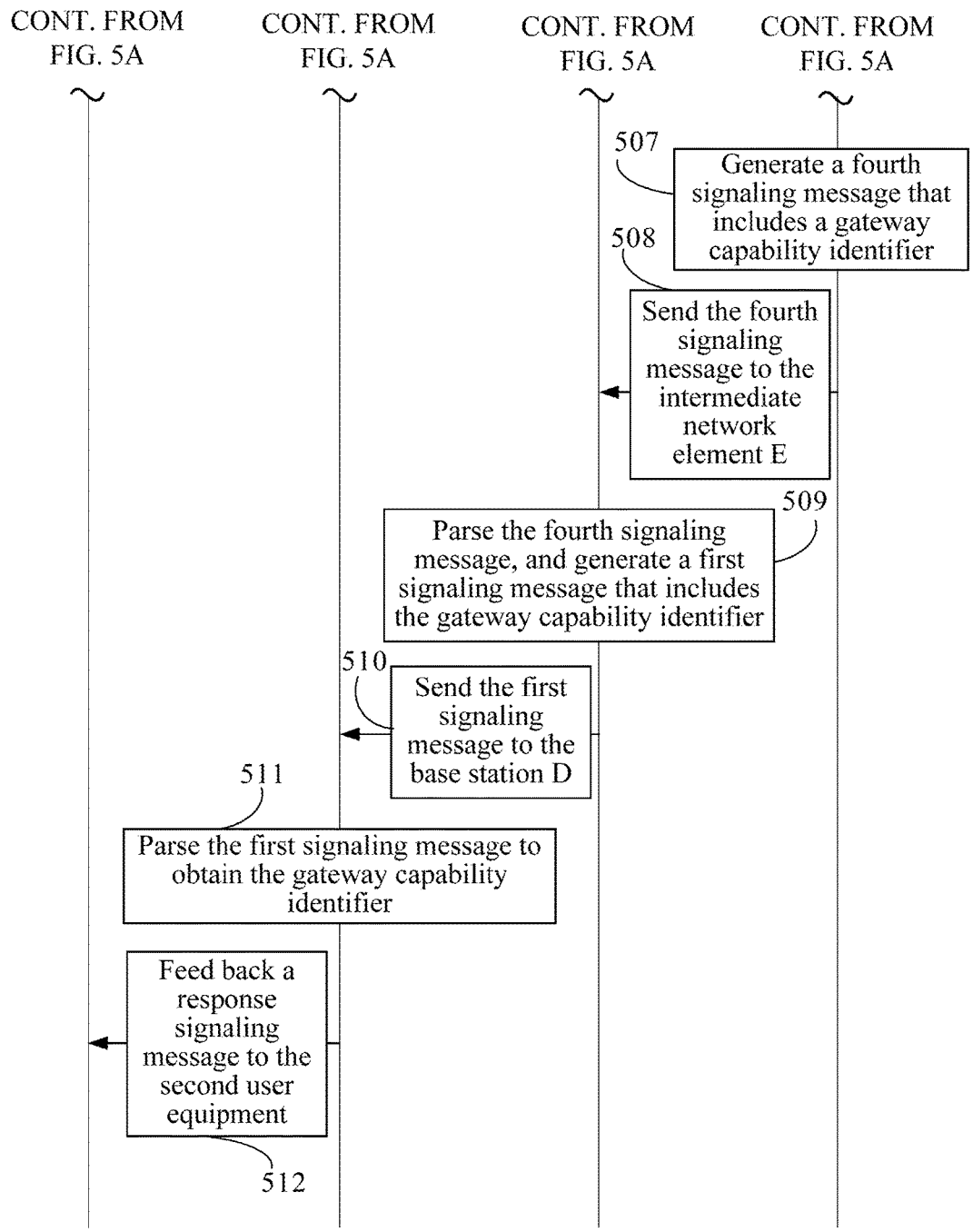

An embodiment of the present invention provides a capability negotiation method. As shown in FIG. 5A and FIG. 5B, a process in which a second user equipment accesses a 4G network is used as an example for description. A base station D is a base station serving a current cell in which the second user equipment is located, an intermediate network element E is a network element that transmits a signaling message between the base station D and a gateway F, and the gateway F is a gateway corresponding to the base station D.

Step 501. The second user equipment sends a signaling message to the base station D according to a state of the second user equipment.

If the second user equipment needs to access a 4G mobile network, the second user equipment sends, to the base station D, a signaling message "Attach Request (attach request)" to request a connection.

If the second user equipment has accessed a 4G mobile network and its location is changed as it moves, according to a specific situation of the location change, the second user equipment chooses to send a signaling message such as "TAU Request (tracking area update request)" to the base station D.

If the second user equipment needs to access a 3G mobile network, the second user equipment sends a signaling message "Activate PDP Context Request (activate Packet Data Protocol context request)" to the base station D.

If the second user equipment has accessed a 3G mobile network and its location is changed as it moves, according to a specific situation of the location change, he second user equipment chooses to send a signaling message such as "RAU Request (routing area update request)" to the base station D.

Step 502. The base station D generates a second signaling message that includes a base station capability identifier.

After receiving the signaling message "Attach Request" indicating that the second user equipment needs to access a 4G mobile network, the base station D determines, according to control required to be established with the gateway F, whether the base station D has a capability of establishing EtoE QoS control. If the base station D has the capability of establishing EtoE QoS control, the base station D generates a second signaling message that includes a base station capability identifier, where the second signaling message also includes a signaling message "INITIAL UE MESSAGE (initial user equipment message)" indicating that the second user equipment needs to access a 4G mobile network. In an actual application, one information element may be added to the signaling message "INITIAL UE MESSAGE" to carry the base station capability identifier. A format definition of the second signaling message is determined according to 3GPP TS36413. For specific explanations, reference may be made to 3GPP TS36413.

After receiving the signaling message such as "TAU Request" sent when the location of the second user equipment accessing a 4G network is changed, the base station D determines, according to control required to be established with the gateway F, whether the base station D has a capability of establishing EtoE QoS control. If the base station D has the capability of establishing EtoE QoS control, the base station D generates a second signaling message that includes a base station capability identifier, where the second signaling message also includes a signaling message indicating that the location of the second user equipment accessing a 4G mobile network is changed. In an actual application, one information element may be added to a signaling message that is sent to the gateway by the base station D and reports that the location of the second user equipment accessing a 4G mobile network is changed, to carry the base station capability identifier, for example, one information element is added to a signaling message "UPLINK NAS TRANSPORT (uplink non access stratum transport)" to carry the base station capability identifier.

After receiving the signaling message "Activate PDP Context Request (activate PDP context request)" indicating that the second user equipment needs to access a 3G mobile network, the base station D determines, according to control required to be established with the gateway F, whether the base station D has a capability of establishing EtoE QoS control. If the base station D has the capability of establishing EtoE QoS control, the base station D generates a second signaling message that includes a base station capability identifier, where the second signaling message also includes a signaling message "INITIAL UE MESSAGE" indicating that the second user equipment needs to access a 3G mobile network. In an actual application, one information element may be added to the signaling message "INITIAL UE MESSAGE" to carry the base station capability identifier. For a specific format definition, refer to 3GPP TS25413.

After receiving the signaling message such as "RAU Request" sent when the location of the second user equipment accessing a 3G network is changed, the base station D determines, according to control required to be established with the gateway F, whether the base station D has a capability of establishing EtoE QoS control. If the base station D has the capability of establishing EtoE QoS control, the base station D generates a second signaling message that includes a base station capability identifier, where the second signaling message also includes a signaling message indicating that the location of the second user equipment accessing a 3G mobile network is changed. In an actual application, one information element may be added to a signaling message that is sent to the gateway by the base station D and reports that the location of the second user equipment accessing a 3G mobile network is changed, to carry the base station capability identifier, for example, one information element is added to a signaling message "DIRECT TRANSFER (direct upload)" to carry the base station capability identifier.

Step 503. The base station D sends the second signaling message to the intermediate network element E.

Step 504. The intermediate network element E parses the second signaling message, and generates a third signaling message that includes the base station capability identifier.

After receiving the second signaling message, the intermediate network element E parses the second signaling message. If the second signaling message received by the intermediate network element E includes the base station capability identifier and the signaling message "INITIAL UE MESSAGE" indicating that the second user equipment needs to access a 4G mobile network, and if one information element is added to the signaling message "INITIAL UE MESSAGE" in the second signaling message to carry the base station capability identifier, the intermediate network element E may acquire the base station capability identifier by parsing the information element, where the base station capability identifier indicates that the base station D has the capability of establishing EtoE QoS control. After obtaining the base station capability identifier, the intermediate network element E generates a third signaling message, where the third signaling message includes the base station capability identifier and a signaling message "Create Session Request (create session request)" indicating that the second user equipment needs to access a 4G mobile network. In an actual application, one information element may be added to the signaling message "Create Session Request" to carry the base station capability identifier. A format definition of the third signaling message is determined according to 3GPP TS29274. For specific explanations, reference may be made to 3GPP TS29274.

If the second signaling message received by the intermediate network element E includes the base station capability identifier and the signaling message such as "UPLINK NAS TRANSPORT (uplink non access stratum transport)" indicating that the location of the second user equipment accessing a 4G mobile network is changed, it is determined, according to the base station capability identifier included in the second signaling message, that the base station D has the capability of establishing EtoE QoS control. After obtaining the base station capability identifier, the intermediate network element E generates a third signaling message, where the third signaling message includes the base station capability identifier and a signaling message indicating that the location of the second user equipment accessing a 4G mobile network is changed. In an actual application, one information element may be added to a signaling message that is used by the intermediate network element E to report that the location of the second user equipment accessing a 4G mobile network is changed, to carry the base station capability identifier. For example, in the 4G mobile network, the intermediate network element E includes an MME (Mobility Management Entity, mobility management entity) and an SGW (Serving Gateway, serving gateway); when the location information of the second user equipment is changed, the MME adds one information element to a signaling message "Create Session Request" to carry the base station capability identifier and sends the obtained signaling message to the SGW, and the SGW obtains the base station capability identifier by parsing the signaling message, and then adds one information element to a signaling message "Modify Bearer Request (modify bearer request)" to carry the base station capability identifier and generates a signaling message required to be sent to the gateway. The signaling message "Create Session Request" to which one information element is added to carry the base station capability identifier and the signaling message "Modify Bearer Request" to which one information element is added to carry the base station capability identifier may both be referred to as a third signaling message.

One information element is added to the signaling message describing that the location of the second user equipment is changed, for example, the intermediate network element MME adds one information element to Create Session Request to carry the base station capability identifier and sends Create Session Request to the SGW, and the intermediate network element SGW adds one information element to Modify Bearer Request to carry the base station capability identifier and sends Modify Bearer Request to the gateway F.

If the second signaling message received by the intermediate network element E includes the base station capability identifier and the signaling message "INITIAL UE MESSAGE" indicating that the second user equipment needs to access a 3G mobile network, it is determined, according to the base station capability identifier included in the second signaling message, that the base station D has the capability of establishing EtoE QoS control. After obtaining the base station capability identifier, the intermediate network element E generates a third signaling message, where the third signaling message includes the base station capability identifier and a signaling message "Create PDP Context Request (create PDP context request)" indicating that the second user equipment needs to access a 3G mobile network. In an actual application, one information element may be added to the signaling message "Create PDP Context Request" to carry the base station capability identifier. For a specific format definition, refer to 3GPP TS29060.

If the second signaling message received by the intermediate network element E includes the base station capability identifier and the signaling message "DIRECT TRANSFER" indicating that the location of the second user equipment accessing a 3G mobile network is changed, it is determined, according to the base station capability identifier included in the second signaling message, that the base station D has the capability of establishing EtoE QoS control. After obtaining the base station capability identifier, the intermediate network element E generates a third signaling message, where the third signaling message includes the base station capability identifier and a signaling message indicating that the location of the second user equipment accessing a 3G mobile network is changed. In an actual application, one information element may be added to a signaling message that is used by the intermediate network element E to report that the location of the second user equipment accessing a 3G mobile network is changed, to carry the base station capability identifier. For example, in the 3G mobile network, one information element is added to a signaling message "Update PDP Context Request (update PDP context request)", which is used by the intermediate network element E to describe that the location of the second user equipment is changed, to carry the base station capability identifier.

Step 505. The intermediate network element E sends the third signaling message to the gateway F.

Step 506. The gateway F parses the third signaling message to obtain the base station capability identifier.

After receiving the third signaling message, the gateway F parses the third signaling message, and if the third signaling message received by the gateway F includes the base station capability identifier and the signaling message "Create Session Request" indicating that the second user equipment needs to access a 4G mobile network, the base station capability identifier is obtained by parsing the third signaling message. Afterwards, it is determined that the gateway F also has the capability of establishing EtoE QoS control and can establish EtoE QoS control with the base station D. Then, the gateway F performs local identification on the EtoE QoS control capability of the base station D. In the meantime, the second user equipment accesses the 4G mobile network, so that the second user equipment performs a data transmission service.

After receiving the third signaling message, the gateway F parses the third signaling message, and if the third signaling message received by the gateway F includes the base station capability identifier and the signaling message indicating that the location of the second user equipment accessing a 4G mobile network is changed, the base station capability identifier is obtained by parsing the third signaling message, where the third signaling message may be the signaling message "Modify Bearer Request" which is sent by the SGW and to which one information element is added to carry the base station capability identifier. It is determined, according to the information that the location of the second user equipment is changed, that the base station D is a base station accessed by the second user equipment after the location of the second user equipment is changed. Afterwards, it is determined that the gateway F also has the capability of establishing EtoE QoS control and can establish EtoE QoS control with the base station D. Then, the gateway F stores the EtoE QoS control capability of the base station A locally.

After receiving the third signaling message, the gateway F parses the third signaling message, and if the third signaling message received by the gateway F includes the base station capability identifier and the signaling message "Create PDP Context Request" indicating that the second user equipment needs to access a 3G mobile network, the base station capability identifier is obtained by parsing the third signaling message. Afterwards, it is determined that the gateway F also has the capability of establishing EtoE QoS control and can establish EtoE QoS control with the base station D. Then, the gateway F stores the EtoE QoS control capability of the base station A locally. In the meantime, the second user equipment accesses the 3G mobile network, so that the second user equipment performs a data transmission service.

After receiving the third signaling message, the gateway F parses the third signaling message, and if the third signaling message received by the gateway F includes the base station capability identifier and the signaling message such as "Update PDP Context Request" indicating that the location of the second user equipment accessing a 3G mobile network is changed, the base station capability identifier is obtained by parsing the third signaling message. It is determined, according to the information that the location of the second user equipment is changed, that the base station D is a base station accessed by the second user equipment after the location of the second user equipment is changed. Afterwards, it is determined that the gateway F also has the capability of establishing EtoE QoS control and can establish EtoE QoS control with the base station D. Then, the gateway F stores the capability of EtoE QoS control of the base station A locally.

Step 507. The gateway F generates a fourth signaling message that includes a gateway capability identifier.

After allowing the second user equipment to access a 4G network, the gateway F generates a fourth signaling message, where the fourth signaling message includes the gateway capability identifier, so that the base station D determines that the gateway F has the capability of establishing EtoE QoS control, and the fourth signaling message also includes a signaling message "Create Session Response (create session response)" for allowing the second user equipment to access a 4G network. In an actual application, one information element may be added to the signaling message "Create Session Response" for allowing the second user equipment to access a 4G network, to carry the gateway capability identifier.

After identifying and processing the information that the location of the second user equipment accessing a 4G network is changed, the gateway F generates a fourth signaling message, where the fourth signaling message includes a gateway capability identifier, so that the base station D determines that the gateway F has the capability of establishing EtoE QoS control, and the fourth signaling message also includes a response signaling message generated after processing of the information that the location of the second user equipment accessing a 4G network is changed. In an actual application, one information element may be added to the response signaling message generated after processing of the information that the location of the second user equipment accessing a 4G network is changed, to carry the gateway capability identifier.

After allowing the second user equipment to access a 3G network, the gateway F generates a fourth signaling message, where the fourth signaling message includes a gateway capability identifier, so that the base station D determines that the gateway F has the capability of establishing EtoE QoS control, and the fourth signaling message also includes a signaling message "Create PDP Context Response (create PDP context response)" for allowing the second user equipment to access a 4G network. In an actual application, one information element may be added to the signaling message "Create PDP Context Response" for allowing the second user equipment to access a 3G network, to carry the gateway capability identifier.

After identifying and processing the information that the location of the second user equipment accessing a 3G network is changed, the gateway F generates a fourth signaling message, where the fourth signaling message includes a gateway capability identifier, so that the base station D determines that the gateway F has the capability of establishing EtoE QoS control, and the fourth signaling message also includes a response signaling message generated after processing of the information that the location of the second user equipment accessing a 3G network is changed. In an actual application, one information element may be added to the response signaling message generated after processing of the information that the location of the second user equipment accessing a 3G network is changed, to carry the gateway capability identifier.

Step 508. The gateway F sends the fourth signaling message to the intermediate network element E.

Step 509. The intermediate network element E parses the fourth signaling message, and generates a first signaling message that includes the gateway capability identifier.

After receiving the fourth signaling message, the intermediate network element E parses the fourth signaling message. If the fourth signaling message received by the intermediate network element E includes the gateway capability identifier and the signaling message "Create Session Response" for allowing the second user equipment to access a 4G mobile network, the gateway capability identifier is obtained by using the fourth signaling message, where the gateway capability identifier indicates that the gateway F has the capability of establishing EtoE QoS control, and then a first signaling message is generated, where the first signaling message includes the gateway capability identifier and a signaling message "DOWNLINK NAS TRANSPORT (downlink NAS transport)" for allowing the second user equipment to access a 4G mobile network. In an actual application, one information element may be added to the signaling message "DOWNLINK NAS TRANSPORT" sent by the intermediate network element E, to carry the gateway capability identifier.

If the fourth signaling message received by the intermediate network element E includes the gateway capability identifier and a response signaling message generated after processing of the information that the location of the second user equipment accessing a 4G network is changed, the gateway capability identifier is obtained by using the fourth signaling message, where the gateway capability identifier indicates that the gateway F has the capability of establishing EtoE QoS control, and then a first signaling message is generated, where the first signaling message includes the gateway capability identifier and the response signaling message generated after processing of the information that the location of the second user equipment accessing a 4G network is changed. In an actual application, one information element may be added to the response signaling message that is generated after processing of the information that the location of the second user equipment accessing a 4G network is changed and is sent by the intermediate network element E, to carry the gateway capability identifier.

After receiving the fourth signaling message, the intermediate network element E parses the fourth signaling message. If the fourth signaling message received by the intermediate network element E includes the gateway capability identifier and a "Create PDP Context Response" message for allowing the second user equipment to access a 3G mobile network, the gateway capability identifier is obtained by using the fourth signaling message, where the gateway capability identifier indicates that the gateway F has the capability of establishing EtoE QoS control, and then a first signaling message is generated, where the first signaling message includes the gateway capability identifier and a signaling message "DIRECT TRANSFER" for allowing the second user equipment to access a 3G mobile network. In an actual application, one information element may be added to the signaling message "DIRECT TRANSFER" sent by the intermediate network element E, to carry the gateway capability identifier.

If the fourth signaling message received by the intermediate network element E includes the gateway capability identifier and a response signaling message generated after processing of the information that the location of the second user equipment accessing a 3G network is changed, the gateway capability identifier is obtained by using the fourth signaling message, where the gateway capability identifier indicates that the gateway F has the capability of establishing EtoE QoS control, and then a first signaling message is generated, where the first signaling message includes the gateway capability identifier and the response signaling message generated after processing of the information that the location of the second user equipment accessing a 3G network is changed. In an actual application, one information element may be added to the response signaling message that is generated after processing of the information that the location of the second user equipment accessing a 3G network is changed and is sent by the intermediate network element E, to carry the gateway capability identifier.

Step 510. The intermediate network element E sends the first signaling message to the base station D.

Step 511. The base station D parses the first signaling message to obtain the gateway capability identifier.

After receiving the first signaling message, the base station D parses the first signaling message. If the first signaling message received by the base station D includes the gateway capability identifier and the signaling message "DOWNLINK NAS TRANSPORT" for allowing the second user equipment to access a 4G mobile network, the gateway capability identifier is obtained by using the first signaling message, and then it is determined that the gateway F also has the capability of establishing EtoE QoS control; EtoE QoS control is established with the gateway F, and the EtoE QoS control capability of the gateway F is stored locally.

After receiving the first signaling message, the base station D parses the first signaling message. If the first signaling message received by the base station D includes the gateway capability identifier and a response signaling message generated after processing of the information that the location of the second user equipment accessing a 4G network is changed, the gateway capability identifier is obtained by using the first signaling message, and then it is determined that the gateway F also has the capability of establishing EtoE QoS control; EtoE QoS control is established with the gateway F, and the EtoE QoS control capability of the gateway F is stored locally.

After receiving the first signaling message, the base station D parses the first signaling message. If the first signaling message received by the base station D includes the gateway capability identifier and the signaling message "DIRECT TRANSFER" for allowing the second user equipment to access a 3G mobile network, the gateway capability identifier is obtained by using the first signaling message, and then it is determined that the gateway F also has the capability of establishing EtoE QoS control; EtoE QoS control is established with the gateway F, and the capability of EtoE QoS control of the gateway F is stored locally.

After receiving the first signaling message, the base station D parses the first signaling message, and if the first signaling message received by the base station D includes the gateway capability identifier and a response signaling message generated after processing of the information that the location of the second user equipment accessing a 3G network is changed, the gateway capability identifier is obtained by using the first signaling message, and then it is determined that the gateway F also has the capability of establishing EtoE QoS control; EtoE QoS control is established with the gateway F, and the capability of EtoE QoS control of the gateway F is stored locally.

Step 512. The base station D feeds back a response signaling message to the second user equipment.

If the first signaling message received by the base station D includes the gateway capability identifier and the signaling message "DOWNLINK NAS TRANSPORT" for allowing the second user equipment to access a 4G mobile network, the signaling message indicating that the second user equipment already accesses a 4G mobile network is fed back to the second user equipment, so that the second user equipment performs a data transmission service.

If the first signaling message received by the base station D includes the gateway capability identifier and a response signaling message generated after processing of the information that the location of the second user equipment accessing a 4G network is changed, the response signaling message, which is generated after processing of the information that the location of the second user equipment accessing a 4G network is changed, is fed back to the second user equipment, so that the second user equipment performs a data transmission service.

If the first signaling message received by the base station D includes the gateway capability identifier and the signaling message "DIRECT TRANSFER" for allowing the second user equipment to access a 3G mobile network, the signaling message indicating that the second user equipment already accesses a 3G mobile network is fed back to the second user equipment, so that the second user equipment performs a data transmission service.

If the first signaling message received by the base station D includes the gateway capability identifier and a response signaling message generated after processing of the information that the location of the second user equipment accessing a 3G network is changed, the response signaling message, which is generated after processing of the information that the location of the second user equipment accessing a 3G network is changed, is fed back to the second user equipment, so that the second user equipment performs a data transmission service.

It should be noted that, in step 502, in a 4G mobile network, the signaling message used by the base station D to describe that the location of the second user equipment is changed may also be a signaling message such as "HANDOVER NOTIFY (handover notify)", "PATH SWITCH REQUEST (path switch request)" or "LOCATION REPORT (location report)". In a 3G mobile network, the signaling message used by the base station D to describe that the location of the second user equipment is changed may also be "LOCATION REPORT". In step 504, in a 4G mobile network, the signaling message used by the intermediate network element E to describe that the location of the second user equipment is changed may also be a signaling message such as "Create Session Request (create session request)", "Create Bearer Response (create bearer response)", "Bearer Resource Command (bearer resource command)", "Update Bearer Response (update bearer response)" or "Change Notification Request (change notification request)". In a 3G mobile network, the signaling message used by the intermediate network element E to describe that the location of the second user equipment is changed may be a signaling message such as "Create PDP Context Request (create PDP context request)", "Update PDP Context Response (update PDP context response)" or "MS Info Change Notification Request (MS information change notification request)". In step 507, in a 4G network, the response signaling message that generated after processing of the information that the location of the second user equipment accessing a 4G network is changed and is sent by the gateway may be "Create Session Response", "Create Bearer Request (create bearer request)", "Modify Bearer Response", "Update Bearer Request (update bearer request)" or "Change Notification Response (change notification response)", and in a 3G network, the response signaling message that generated after processing of the information that the location of the second user equipment accessing a 3G network is changed and is sent by the gateway may be "Create PDP Context Response", "Update PDP Context Request", "Update PDP Context Response" or "MS Info Change Notification Response (MS information change notify response)". In step 509, in a 4G network, the response signaling message that is generated after processing of the information that the location of the second user equipment accessing a 4G network is changed and is sent by the intermediate network element may be "DOWNLINK NAS TRANSPORT" or "LOCATION REPORTING CONTROL (location reporting control)", and in a 3G network, the response signaling message that is generated after processing of the information that the location of the second user equipment accessing a 3G network is changed and is sent by the intermediate network element may be "DIRECT TRANSFER" or "LOCATION REPORTING CONTROL".

It should be noted that, the sequence of the steps of the capability negotiation method provided in this embodiment of the present invention may be adjusted to a certain extent, and steps may also be added or deleted according to circumstances. Any variation that can be readily figured out by a person skilled in the art within the technical scope disclosed in the present invention shall fall within the protection scope of the present invention, and therefore is not described again.

In the capability negotiation method provided in this embodiment of the present invention, when a gateway and a base station perform EtoE QoS control capability negotiation by using signaling messages, an intermediate network element receives and parses a second signaling message that includes a base station capability identifier and is sent by the base station, to obtain the base station capability identifier, and then generates a third signaling message that includes the base station capability identifier and sends the third signaling message to the gateway, so that the gateway can obtain an EtoE QoS control capability of the base station; and the intermediate network element receives and parses a fourth signaling message that includes a gateway capability identifier and is sent by the gateway, to obtain the gateway capability identifier, and generates a first signaling message that includes the gateway capability identifier and sends the first signaling message to the base station, so that the base station can obtain an EtoE QoS control capability of the gateway. Compared with the prior art, the EtoE QoS control capability negotiation between the base station and the gateway exhibits higher flexibility.

Figure 6:
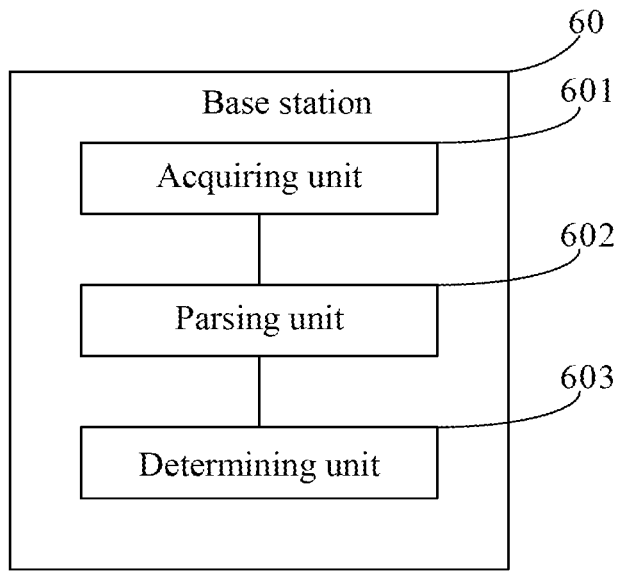
FIG. 6 is a schematic structural diagram of a base station according to an embodiment of the present invention.

An embodiment of the present invention provides a base station 60, as shown in FIG. 6, including:

an acquiring unit 601, configured to acquire a gateway capability identifier, where the gateway capability identifier is a description of an EtoE QoS control capability of a gateway;

a parsing unit 602, configured to parse the gateway capability identifier acquired by the acquiring unit 601, to obtain the EtoE QoS control capability of the gateway; and a determining unit 603, configured to determine whether the EtoE QoS control capability of the gateway acquired by the parsing unit 602 matches a local EtoE QoS control capability, so that when the EtoE QoS control capability of the gateway matches the local EtoE QoS control capability, EtoE QoS control is established.

In this way, when performing EtoE QoS control capability negotiation with the gateway, the base station can first acquire the gateway capability identifier by using the acquiring unit, then obtain the EtoE QoS control capability of the gateway by using the parsing unit, and finally determine, by using the determining unit, whether the EtoE QoS control capability of the gateway matches the local EtoE QoS control capability of the base station. Compared with the prior art, the EtoE QoS control capability negotiation exhibits higher flexibility.

Figure 7:
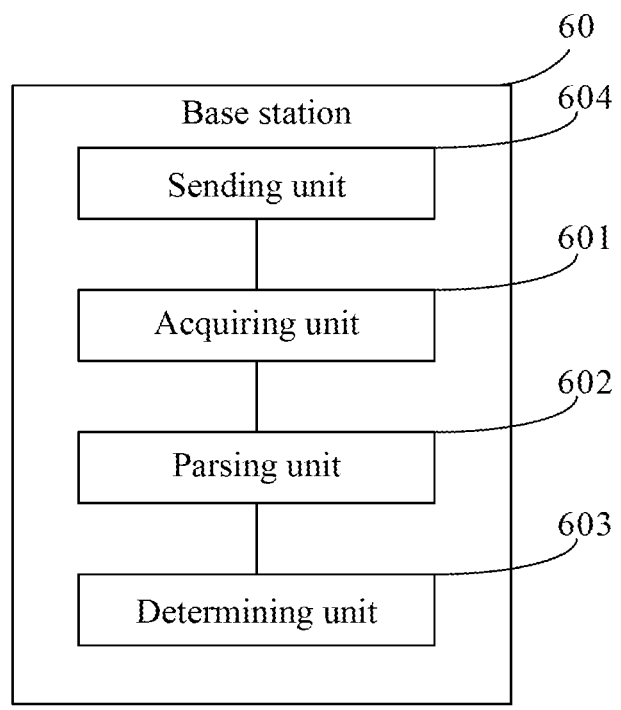
FIG. 7 is a schematic structural diagram of another base station according to an embodiment of the present invention.

As shown in FIG. 7, the base station 60 further includes:

a sending unit 604, configured to send a base station capability identifier to the gateway, or send a base station capability identifier to an intermediate network element, where the base station capability identifier is a description of an EtoE QoS control capability of the base station 60.

The acquiring unit 601 is specifically configured to:

receive a downlink data packet sent by the gateway, where the downlink data packet includes the gateway capability identifier; and parse the downlink data packet to obtain the gateway capability identifier.

The sending unit 604 is specifically configured to:

generate an uplink data packet, where the uplink data packet includes the base station capability identifier; and send the uplink data packet to the gateway.

The uplink data packet further includes heartbeat information of the base station 60, and the heartbeat information is a state description of the EtoE QoS control capability of the base station 60.

The base station capability identifier is located in an extension header of a General Packet Radio Service Tunnelling Protocol for the user plane header of the uplink data packet.

The heartbeat information is located in the extension header of the General Packet Radio Service Tunnelling Protocol for the user plane header of the uplink data packet.

The acquiring unit 601 is further configured to:

receive a first signaling message sent by the intermediate network element, where the first signaling message includes the gateway capability identifier, and the first signaling message is generated after the intermediate network element obtains the gateway capability identifier by parsing a fourth signaling message sent by the gateway; and parse the first signaling message to obtain the gateway capability identifier.

The sending unit 604 is further configured to:

generate a second signaling message, where the second signaling message includes the base station capability identifier; and send the second signaling message to the intermediate network element, so that the intermediate network element parses the second signaling message to obtain the base station capability identifier, and generates and sends a third signaling message to the gateway, where the third signaling message includes the base station capability identifier.

In the capability negotiation method provided in this embodiment of the present invention, when a base station and a gateway perform EtoE QoS control capability negotiation, the base station acquires a gateway capability identifier by using an acquiring unit, obtains an EtoE QoS control capability of the gateway by using a parsing unit, and then determines, by using a determining unit, whether the EtoE QoS control capability of the gateway matches an EtoE QoS control capability of the base station, and sends a base station capability identifier by using a sending unit, so that the gateway determines whether the EtoE QoS control capability of the base station matches the EtoE QoS control capability of the gateway. The EtoE QoS control is established when capabilities of the two parties are matched. Compared with the prior art, a process of the EtoE QoS control capability negotiation between the base station and the gateway exhibits higher flexibility.

Figure 8:
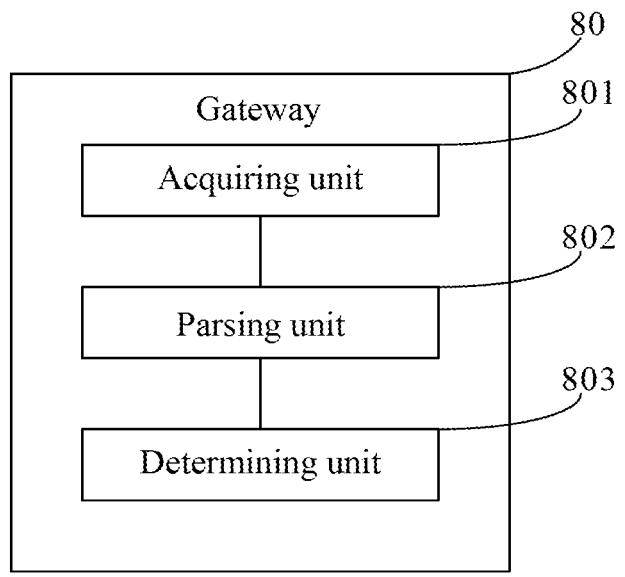
FIG. 8 is a schematic structural diagram of a gateway according to an embodiment of the present invention.

An embodiment of the present invention provides a gateway 80, as shown in FIG. 8, including:

an acquiring unit 801, configured to acquire a base station capability identifier, where the base station capability identifier is a description of an EtoE QoS control capability of a base station;

a parsing unit 802, configured to parse the base station capability identifier acquired by the acquiring unit 801, to obtain the EtoE QoS control capability of the base station; and a determining unit 803, configured to determine whether the EtoE QoS control capability of the base station acquired by the parsing unit 802 matches a local EtoE QoS control capability, so that when an EtoE QoS control capability of the base station matches the local EtoE QoS control capability, EtoE QoS control is established.

In this way, when performing EtoE QoS control capability negotiation with the base station, the gateway can first acquire the base station capability identifier by using the acquiring unit, obtain the EtoE QoS control capability of the base station by using the parsing unit, and then determine, by using the determining unit, whether the EtoE QoS control capability of the base station matches the local EtoE QoS control capability of the gateway 80. Compared with the prior art, the EtoE QoS control capability negotiation exhibits higher flexibility.

Figure 9:
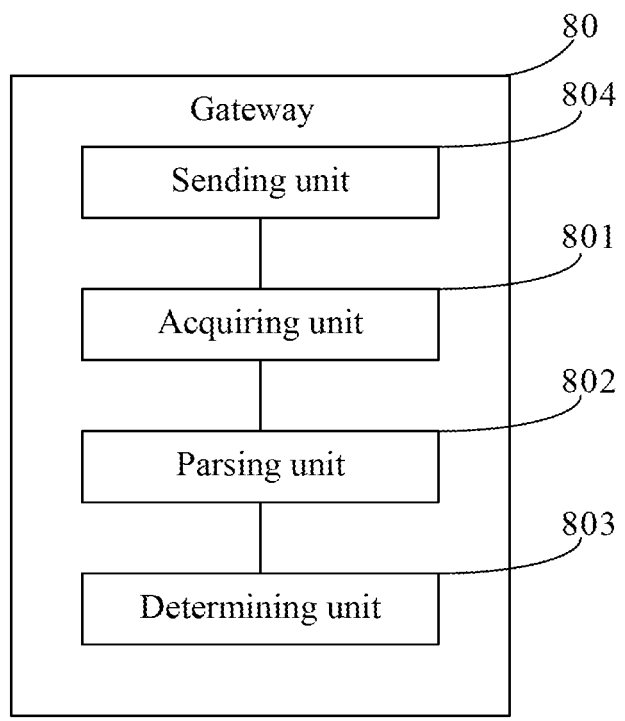
FIG. 9 is a schematic structural diagram of another gateway according to an embodiment of the present invention.

As shown in FIG. 9, the gateway 80 further includes:

a sending unit 804, configured to send a gateway capability identifier to the base station, or send a gateway capability identifier to an intermediate network element, where the gateway capability identifier is a description of an EtoE QoS control capability of the gateway 80.

The acquiring unit 801 is specifically configured to:

receive an uplink data packet sent by the base station, where the uplink data packet includes the base station capability identifier; and parse the uplink data packet to obtain the base station capability identifier.

The sending unit 804 is specifically configured to:

generate a downlink data packet, where the downlink data packet includes the gateway capability identifier; and send the downlink data packet to the base station.

The uplink data packet further includes heartbeat information of the base station, and the heartbeat information is a state description of the EtoE QoS control capability supported by the base station.

The parsing unit 802 is further configured to parse the uplink data packet to obtain the heartbeat information, and determine a state of the EtoE QoS control capability of the base station according to the heartbeat information.

The gateway capability identifier is located in an extension header of a General Packet Radio Service Tunnelling Protocol for the user plane header of the downlink data packet.

The heartbeat information is located in an extension header of a General Packet Radio Service Tunnelling Protocol for the user plane header of the uplink data packet.

The acquiring unit 801 is further configured to:

receive a third signaling message sent by the intermediate network element, where the third signaling message includes the base station capability identifier, and the third signaling message is generated after the intermediate network element obtains the base station capability identifier by parsing a second signaling message sent by the base station; and parse the third signaling message to obtain the base station capability identifier.

The sending unit 804 is further configured to:

generate a fourth signaling message, where the fourth signaling message includes the gateway capability identifier; and send the fourth signaling message to the intermediate network element, so that the intermediate network element parses the fourth signaling message to obtain the gateway capability identifier, and generates and sends a first signaling message to the base station, where the first signaling message includes the gateway capability identifier.

In the capability negotiation method provided in this embodiment of the present invention, when a gateway and a base station perform EtoE QoS control capability negotiation, the gateway acquires a base station capability identifier by using an acquiring unit, obtains an EtoE QoS control capability of the base station by using a parsing unit, then determines, by using a determining unit, whether the EtoE QoS control capability of the base station matches a local EtoE QoS control capability of the gateway, and sends a gateway capability identifier by using a sending unit, so that the base station determines whether the EtoE QoS control capability of the gateway 80 matches the local EtoE QoS control capability of the base station. The EtoE QoS control is established when capabilities of the two parties are matched. Compared with the prior art, the EtoE QoS control capability negotiation between the base station and the gateway exhibits higher flexibility.

Figure 10:
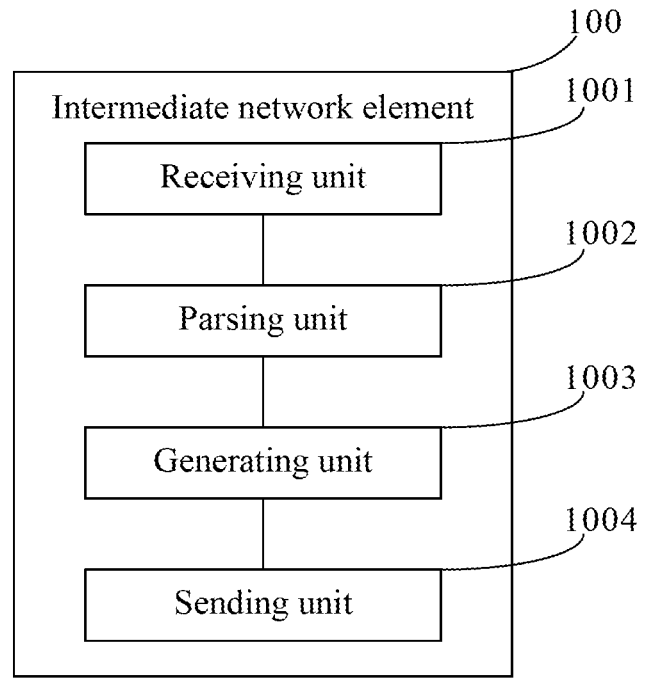
FIG. 10 is a schematic structural diagram of an intermediate network element according to an embodiment of the present invention.

An embodiment of the present invention provides an intermediate network element 100, as shown in FIG. 10, including:

a receiving unit 1001, configured to receive a second signaling message sent by a base station, where the second signaling message includes a base station capability identifier, and the base station capability identifier is a description of an EtoE QoS control capability of the base station;

a parsing unit 1002, configured to parse the second signaling message received by the receiving unit 1001, to obtain the base station capability identifier;

a generating unit 1003, configured to generate a third signaling message according to the base station capability identifier obtained by the parsing unit 1002, where the third signaling message includes the base station capability identifier; and a sending unit 1004, configured to send the third signaling message generated by the generating unit 1003 to a gateway, so that the gateway parses the third signaling message to obtain the base station capability identifier.

In this way, when the base station and the gateway perform capability negotiation by using signaling messages, the intermediate network element receives, by using the receiving unit, the second signaling message that carries the base station capability identifier and is sent by the base station, obtains the EtoE QoS control capability of the base station by using the parsing unit, then generates, by using the generating unit, a third signaling message that carries the base station capability identifier, and sends the third signaling message to the gateway by using the sending unit, so that the gateway can obtain the base station capability identifier, and finally obtain the EtoE QoS control capability of the base station. Then, the gateway can determine whether the EtoE QoS control capability of the base station matches a local EtoE QoS control capability of the gateway. Compared with the prior art, the EtoE QoS control capability negotiation exhibits higher flexibility.

The receiving unit 1001 is further configured to receive a fourth signaling message sent by the gateway, where the fourth signaling message includes a gateway capability identifier, and the gateway capability identifier is a description of an EtoE QoS control capability of the gateway.

The parsing unit 1002 is further configured to parse the fourth signaling message received by the receiving unit 1001, to obtain the gateway capability identifier.

The generating unit 1003 is further configured to generate a first signaling message according to the gateway capability identifier obtained by the parsing unit 1002, where the first signaling message includes the gateway capability identifier.

The sending unit 1004 is further configured to send the first signaling message generated by the generating unit 1003 to the base station, so that the base station parses the first signaling message to obtain the gateway capability identifier.

In the capability negotiation method provided in this embodiment of the present invention, when a gateway and a base station perform EtoE QoS control capability negotiation by using signaling messages, an intermediate network element receives, by using a receiving unit, a second signaling message that includes a base station capability identifier and is sent by the base station, parses the second signaling message, obtains an EtoE QoS control capability of the base station by using a parsing unit, then generates, by using a generating unit, a third signaling message that includes the base station capability identifier, and sends the third signaling message to the gateway by using a sending unit, so that the gateway can obtain the EtoE QoS control capability of the base station; and the intermediate network element receives and parses, by using the receiving unit and the parsing unit, a fourth signaling message that includes a gateway capability identifier and is sent by the gateway, to obtain the gateway capability identifier, generates, by using the generating unit, a first signaling message that includes the gateway capability identifier, and sends the first signaling message to the base station by using the sending unit, so that the base station can obtain an EtoE QoS control capability of the gateway. Compared with the prior art, the EtoE QoS control capability negotiation between the base station and the gateway exhibits higher flexibility.

An embodiment of the present invention provides a capability negotiation system, including:

the base station according to any one of the foregoing embodiments; the gateway according to any one of the foregoing embodiments; and the intermediate network element according to any one of the foregoing embodiments.

In the capability negotiation system provided in this embodiment of the present invention, when a gateway and a base station perform EtoE QoS control capability negotiation, the base station can receive and parse a gateway capability identifier sent by the gateway, obtain an EtoE QoS control capability of the gateway by means of parsing; and the gateway can receive and parse a base station capability identifier sent by the base station, obtain an EtoE QoS control capability of the base station by means of parsing, and send the gateway capability identifier to the base station, so that the base station can obtain the EtoE QoS control capability of the gateway. Compared with the prior art, the EtoE QoS control capability negotiation between the base station and the gateway exhibits higher flexibility.

Figure 11:
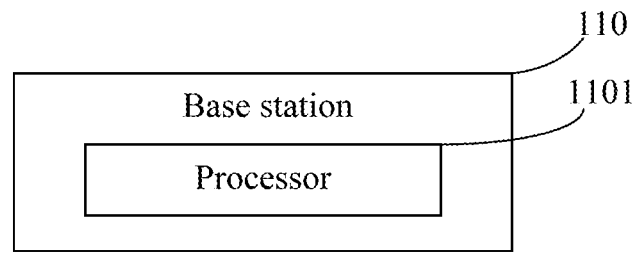
FIG. 11 is a schematic structural diagram of still another base station according to an embodiment of the present invention.

An embodiment of the present invention provides a base station 110, as shown in FIG. 11, including:

a processor 1101, configured to acquire a gateway capability identifier, where the gateway capability identifier is a description of an end to end quality of service EtoE QoS control capability of a gateway; parse the gateway capability identifier to obtain the EtoE QoS control capability of the gateway; and determine whether the EtoE QoS control capability of the gateway matches a local EtoE QoS control capability, so that when the EtoE QoS control capability of the gateway matches the local EtoE QoS control capability, EtoE QoS control is established.

In this way, when performing EtoE QoS control capability negotiation with the gateway, the base station can first acquire the gateway capability identifier, then obtain the EtoE QoS control capability of the gateway by means of parsing, and finally determine whether the EtoE QoS control capability of the gateway matches the local EtoE QoS control capability of the base station. Compared with the prior art, the EtoE QoS control capability negotiation exhibits higher flexibility.

Figure 12:
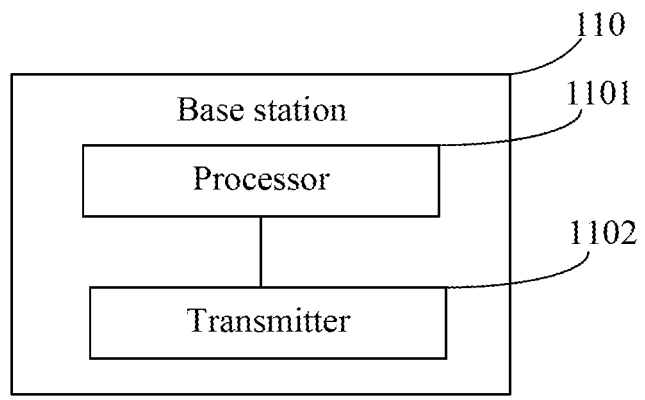
FIG. 12 is a schematic structural diagram of still another base station according to an embodiment of the present invention.

As shown in FIG. 12, the base station 110 further includes:

a transmitter 1102, configured to send a base station capability identifier to the gateway, or send the base station capability identifier to an intermediate network element, where the base station capability identifier is a description of an EtoE QoS control capability of the base station 110.

Figure 13:
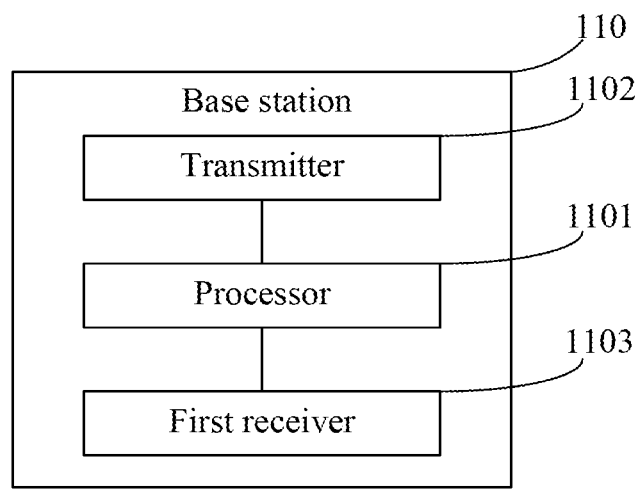
FIG. 13 is a schematic structural diagram of still another base station according to an embodiment of the present invention.

As shown in FIG. 13, the base station 110 further includes:

a first receiver 1103, configured to receive a downlink data packet sent by the gateway, where the downlink data packet includes the gateway capability identifier.

The processor 1101 is specifically configured to parse the downlink data packet to obtain the gateway capability identifier.

The processor 1101 is specifically configured to generate an uplink data packet, where the uplink data packet includes the base station capability identifier.

The transmitter 1102 is specifically configured to send the uplink data packet to the gateway.

The uplink data packet further includes heartbeat information of the base station 110, and the heartbeat information is a state description of the EtoE QoS control capability of the base station 110.

The base station capability identifier is located in an extension header of a General Packet Radio Service Tunnelling Protocol for the user plane header of the uplink data packet.

The heartbeat information is located in the extension header of the General Packet Radio Service Tunnelling Protocol for the user plane header of the uplink data packet.

Figure 14:
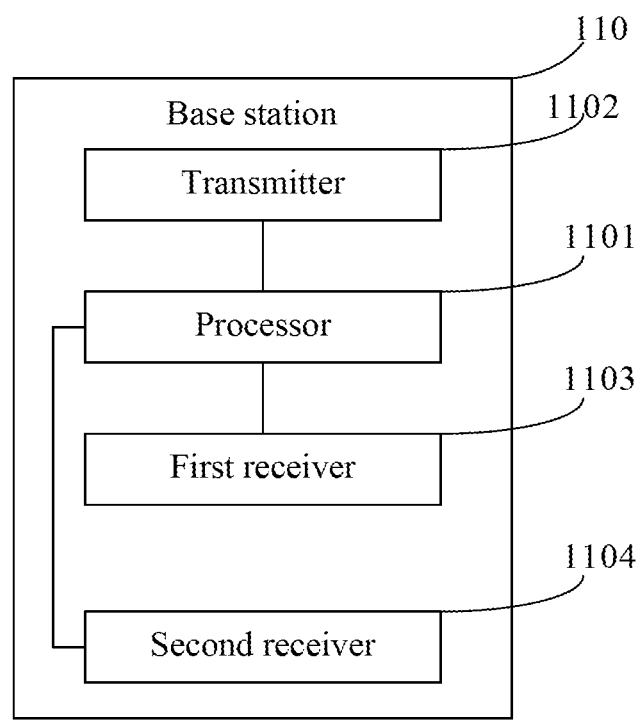
FIG. 14 is a schematic structural diagram of still another base station according to an embodiment of the present invention.

As shown in FIG. 14, the base station further includes a second receiver 1104, configured to receive a first signaling message sent by the intermediate network element, where the first signaling message includes the gateway capability identifier, and the first signaling message is generated after the intermediate network element obtains the gateway capability identifier by parsing a fourth signaling message sent by the gateway.

The processor 1101 is further configured to parse the first signaling message to obtain the gateway capability identifier.

The processor 1101 is further configured to generate a second signaling message, where the second signaling message includes the base station capability identifier.

The transmitter 1102 is further configured to send the second signaling message to the intermediate network element, so that the intermediate network element parses the second signaling message to obtain the base station capability identifier, and generates and sends a third signaling message to the gateway, where the third signaling message includes the base station capability identifier.

In the capability negotiation method provided in this embodiment of the present invention, when a base station and a gateway perform EtoE QoS control capability negotiation, the base station first acquires a gateway capability identifier, obtains an EtoE QoS control capability of the gateway by means of parsing, then determines whether the EtoE QoS control capability of the gateway matches an EtoE QoS control capability of the base station, and sends a base station capability identifier, so that the gateway determines whether the EtoE QoS control capability of base station matches the EtoE QoS control capability of the gateway. The EtoE QoS control is established when capabilities of the two parties are matched. Compared with the prior art, a process of the EtoE QoS control capability negotiation between the base station and the gateway exhibits higher flexibility.

Figure 15:
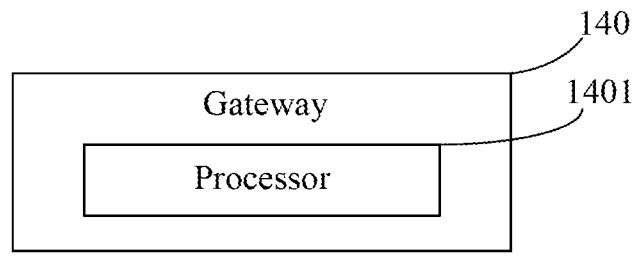
FIG. 15 is a schematic structural diagram of still another gateway according to an embodiment of the present invention.

An embodiment of the present invention provides a gateway 140, as shown in FIG. 15, including:

a processor 1401, configured to acquire a base station capability identifier, where the base station capability identifier is a description of an EtoE QoS control capability of a base station; parse the base station capability identifier to obtain the EtoE QoS control capability of the base station;

and determine whether the EtoE QoS control capability of the base station matches a local EtoE QoS control capability, so that when the EtoE QoS control capability of the base station matches the local EtoE QoS control capability, EtoE QoS control is established.

In this way, when performing EtoE QoS control capability negotiation with the base station, the gateway can acquire the base station capability identifier, obtain the EtoE QoS control capability of the base station by means of parsing, and then determine whether the EtoE QoS control capability of the base station matches the local EtoE QoS control capability of the gateway 140. Compared with the prior art, the EtoE QoS control capability negotiation exhibits higher flexibility.

Figure 16:
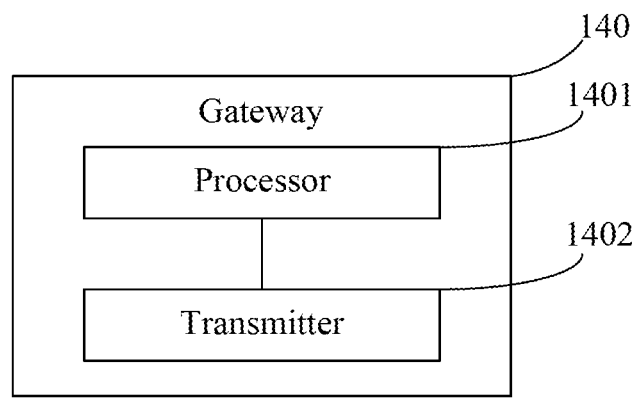
FIG. 16 is a schematic structural diagram of still another gateway according to an embodiment of the present invention.

As shown in FIG. 16, the gateway 140 further includes:

a transmitter 1402, configured to send a gateway capability identifier to the base station, or send a gateway capability identifier to an intermediate network element, where the gateway capability identifier is a description of an EtoE QoS control capability of the gateway 140.

Figure 17:
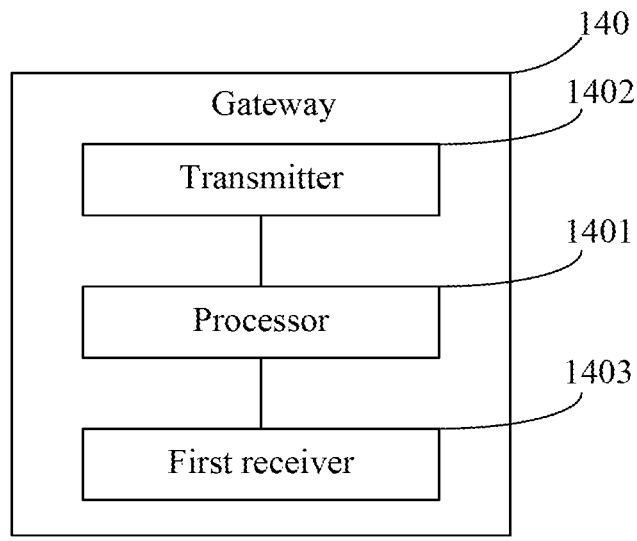
FIG. 17 is a schematic structural diagram of still another gateway according to an embodiment of the present invention.

As shown in FIG. 17, the gateway 140 further includes a first receiver 1403, configured to receive an uplink data packet sent by the base station, where the uplink data packet includes the base station capability identifier.

The processor 1401 is specifically configured to parse the uplink data packet to obtain the base station capability identifier.

The processor 1401 is specifically configured to generate a downlink data packet, where the downlink data packet includes the gateway capability identifier.

The transmitter 1402 is configured to send the downlink data packet to the base station.

The uplink data packet further includes heartbeat information of the base station, and the heartbeat information is a state description of the EtoE QoS control capability supported by the base station, and the processor 1401 is further configured to:

parse the uplink data packet to obtain the heartbeat information, and determine a state of the EtoE QoS control capability of the base station according to the heartbeat information.

The gateway capability identifier is located in an extension header of a General Packet Radio Service Tunnelling Protocol for the user plane header of the downlink data packet.

The heartbeat information is located in an extension header of a General Packet Radio Service Tunnelling Protocol for the user plane header of the uplink data packet.

Figure 18:
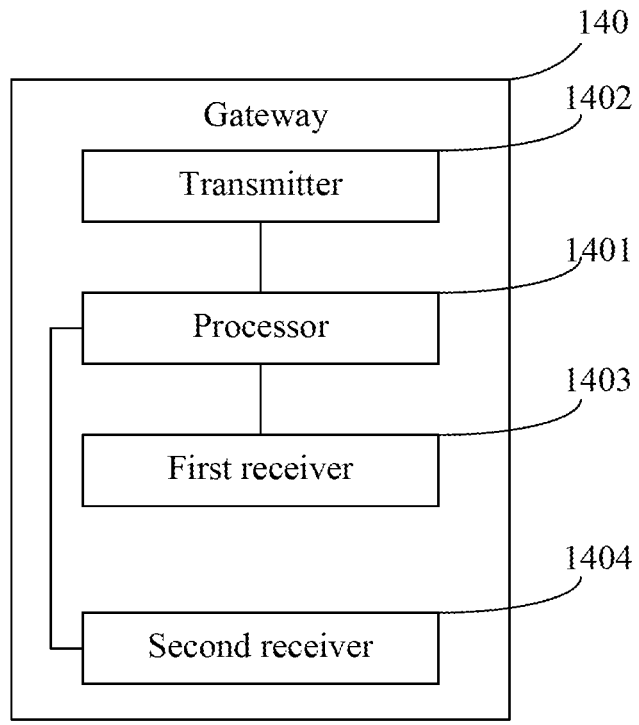
FIG. 18 is a schematic structural diagram of still another gateway according to an embodiment of the present invention.

As shown in FIG. 18, the gateway further includes a second receiver 1404, configured to receive a third signaling message sent by an intermediate network element, where the third signaling message includes the base station capability identifier, and the third signaling message is generated after the intermediate network element obtains the base station capability identifier by parsing a second signaling message sent by the base station.

The processor 1401 is further configured to parse the third signaling message to obtain the base station capability identifier.

The processor 1401 is further configured to generate a fourth signaling message, where the fourth signaling message includes the gateway capability identifier.

The transmitter 1402 is further configured to send the fourth signaling message to the intermediate network element, so that the intermediate network element parses the fourth signaling message to obtain the gateway capability identifier, and generates and sends a first signaling message to the base station, where the first signaling message includes the gateway capability identifier.

In the capability negotiation method provided in this embodiment of the present invention, when a gateway and a base station perform EtoE QoS control capability negotiation, the gateway acquires a base station capability identifier, obtains an EtoE QoS control capability of the base station by means of parsing, then determines whether the EtoE QoS control capability of the base station matches a local EtoE QoS control capability of the gateway, and sends a gateway capability identifier, so that the base station determines whether the EtoE QoS control capability of the gateway 80 matches a local EtoE QoS control capability of the base station. The EtoE QoS control is established when capabilities of the two parties are matched. Compared with the prior art, the EtoE QoS control capability negotiation between the base station and the gateway 80 exhibits higher flexibility.

Figure 19:
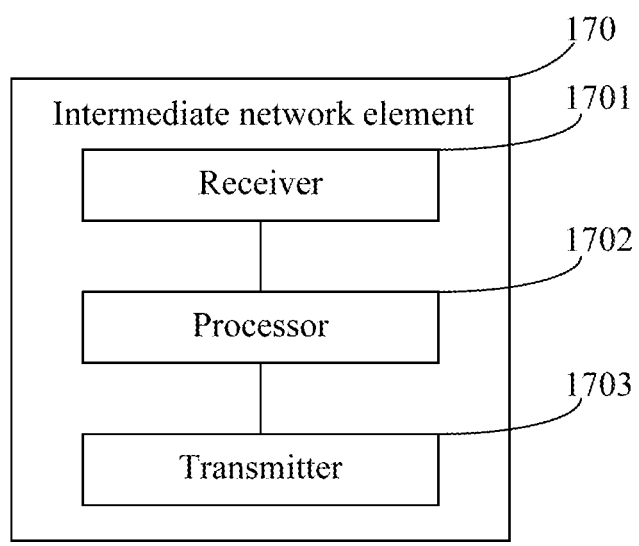
FIG. 19 is a schematic structural diagram of another intermediate network element according to an embodiment of the present invention.

An embodiment of the present invention provides an intermediate network element 170, as shown in FIG. 19, including:

a receiver 1701, configured to receive a second signaling message sent by a base station, where the second signaling message includes a base station capability identifier, and the base station capability identifier is a description of an EtoE QoS control capability of the base station; and a processor 1702, configured to parse the second signaling message to obtain the base station capability identifier; and generate a third signaling message, where the third signaling message includes the base station capability identifier; and a transmitter 1703, configured to send the third signaling message to a gateway, so that the gateway parses the third signaling message to obtain the base station capability identifier.

In this way, when the base station and the gateway perform capability negotiation by using signaling messages, the intermediate network element receives a second signaling message that carries the base station capability identifier and is sent by the base station, obtains the EtoE QoS control capability of the base station by means of parsing, and then generates a third signaling message that carries the base station capability identifier and sends the third signaling message to the gateway, so that the gateway can obtain the base station capability identifier, and finally obtain the EtoE QoS control capability of the base station. Then, the gateway can determine whether the EtoE QoS control capability of the base station matches a local EtoE QoS control capability of the gateway. Compared with the prior art, the EtoE QoS control capability negotiation exhibits higher flexibility.

The receiver 1701 is further configured to receive a fourth signaling message sent by the gateway, where the fourth signaling message includes a gateway capability identifier, and the gateway capability identifier is a description of an EtoE QoS control capability of the gateway.

The processor 1702 is further configured to parse the fourth signaling message to obtain the gateway capability identifier; and generate a first signaling message, where the first signaling message includes the gateway capability identifier.

The transmitter 1703 is further configured to send the first signaling message to the base station, so that the base station parses the first signaling message to obtain the gateway capability identifier.

In the capability negotiation method provided in this embodiment of the present invention, when a gateway and a base station perform EtoE QoS control capability negotiation by using signaling messages, an intermediate network element receives and parses a second signaling message that includes a base station capability identifier and is sent by the base station, obtains an EtoE QoS control capability of the base station by means of parsing, and then generates a third signaling message that includes the base station capability identifier and sends the third signaling message to the gateway, so that the gateway can obtain the EtoE QoS control capability of the base station; and the intermediate network element receives and parses a fourth signaling message that includes a gateway capability identifier and is sent by the gateway, to obtain the gateway capability identifier, and generates a first signaling message that includes the gateway capability identifier and sends the first signaling message to the base station, so that the base station can obtain an EtoE QoS control capability of the gateway. Compared with the prior art, the EtoE QoS control capability negotiation between the base station and the gateway exhibits higher flexibility.

An embodiment of the present invention provides a capability negotiation system, including:

the base station according to any one of the foregoing embodiments; the gateway according to any one of the foregoing embodiments; and the intermediate network element according to any one of the foregoing embodiments.

In the capability negotiation system provided in this embodiment of the present invention, when a gateway and a base station perform EtoE QoS control capability negotiation, the base station can receive and parse a gateway capability identifier sent by the gateway, obtain an EtoE QoS control capability of the gateway by means of parsing, and finally can obtain the EtoE QoS control capability of the gateway; and the gateway can receive and parse a base station capability identifier sent by the base station, obtain an EtoE QoS control capability of the base station by means of parsing, and send a gateway capability identifier to the base station, so that the base station can obtain the EtoE QoS control capability of the gateway. Compared with the prior art, the EtoE QoS control capability negotiation between the base station and the gateway exhibits higher flexibility.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in an actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented by hardware in addition to a software functional unit, or by hardware only.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A capability negotiation method, wherein the method is applied to a gateway and comprises:
    acquiring, from a base station, a base station capability identifier, wherein the base station capability identifier indicates a type of end to end quality of service (EtoE QoS) control that the base station is capable of providing, and wherein the type of EtoE QoS control of the base station specifies a mechanism for determining transmission priority for a plurality of different data packets;
    parsing the base station capability identifier to obtain an EtoE QoS control capability of the base station; and
    determining whether the EtoE QoS control capability of the base station matches a local EtoE QoS control capability of the gateway, wherein the EtoE QoS control capability of the base station matches the local EtoE QoS control capability of the gateway when the gateway is capable of providing the mechanism for determining transmission priority for the plurality of different data packets specified by the type of EtoE QoS control indicated by the base station capability identifier; and
    in response to a determination that the EtoE QoS control capability of the base station matches the local EtoE QoS control capability of the gateway, establishing the type of EtoE QoS control between the gateway and the base station.

2. The method according to claim 1, wherein before the acquiring a base station capability identifier, the method further comprises:
    sending a gateway capability identifier to the base station, or sending the gateway capability identifier to an intermediate network element, wherein the gateway capability identifier is a description of the local EtoE QoS control capability of the gateway.

3. The method according to claim 2, wherein the sending a gateway capability identifier to the base station comprises:
    generating a downlink data packet, wherein the downlink data packet comprises the gateway capability identifier; and
    sending the downlink data packet to the base station.

4. The method according to claim 1, wherein the acquiring a base station capability identifier comprises:
    receiving an uplink data packet sent by the base station, wherein the uplink data packet comprises the base station capability identifier; and
    parsing the uplink data packet to obtain the base station capability identifier.

5. The method according to claim 4, wherein the uplink data packet further comprises heartbeat information of the base station, and the heartbeat information is a state description of the EtoE QoS control capability supported by the base station, and the method further comprises:

parsing the uplink data packet to obtain the heartbeat information, and determining a state of the EtoE QoS control capability of the base station according to the heartbeat information.

6. The method according to claim 4, wherein the base station capability identifier is located in an extension header of a General Packet Radio Service Tunneling Protocol for the user plane (GTP-U) header of the uplink data packet.

7. The method according to claim 5, wherein the heartbeat information is located in an extension header of the GTP-U header of the uplink data packet.

8. The method according to claim 1 further comprising in response to a determination that the EtoE QoS control capability of the base station does not match the local EtoE QoS control capability of the gateway, not establishing the type of EtoE QoS control between the gateway and the base station.

9. A gateway, comprising:
a processor;
a memory storing a program to be executed in the processor, the program comprising instructions for:
acquiring, from a base station, a base station capability identifier, wherein the base station capability identifier indicates a type of end to end quality of service (EtoE QoS) control that the base station is capable of providing, and wherein the type of EtoE QoS control of the base station specifies a mechanism for determining transmission priority for a plurality of different data packets;
parsing the base station capability identifier to obtain an EtoE QoS control capability of the base station; and
determining whether the EtoE QoS control capability of the base station matches a local EtoE QoS control capability of the gateway, wherein the EtoE QoS control capability of the base station matches the local EtoE QoS control capability of the gateway when the gateway is capable of providing the mechanism for determining transmission priority for the plurality of different data packets specified by the type of EtoE QoS control indicated by the base station capability identifier; and
in response to a determination that the EtoE QoS control capability of the base station matches the local EtoE QoS control capability of the gateway, establishing EtoE QoS control between the gateway and the base station.

10. The gateway according to claim 9, wherein the gateway further comprises:
a transmitter configured to send a gateway capability identifier to the base station, or send the gateway capability identifier to an intermediate network element, wherein the gateway capability identifier is a description of the local EtoE QoS control capability of the gateway.

11. The gateway according to claim 10, wherein the program comprises further instructions for generating a downlink data packet, wherein the downlink data packet comprises the gateway capability identifier; and
wherein the transmitter is configured to send the downlink data packet to the base station.

12. The gateway according to claim 9, wherein the gateway further comprises a first receiver, configured to receive an uplink data packet sent by the base station, wherein the uplink data packet comprises the base station capability identifier; and
wherein the program comprises further instructions for parsing the uplink data packet to obtain the base station capability identifier.

13. The gateway according to claim 12, wherein the uplink data packet further comprises heartbeat information of the base station, and the heartbeat information is a state description of the EtoE QoS control capability supported by the base station, and wherein the program comprises further instructions for:
parsing the uplink data packet to obtain the heartbeat information, and
determining a state of the EtoE QoS control capability of the base station according to the heartbeat information.

14. The gateway according to claim 9, wherein the instructions comprise further instructions to: in response to a determination that the EtoE QoS control capability of the base station does not match the local EtoE QoS control capability of the gateway, not establish the type of EtoE QoS control between the gateway and the base station.

15. A non-transitory computer readable medium storing computer readable instructions which, when executed by a processor, cause a gateway to:
acquire, from a base station, a base station capability identifier, wherein the base station capability identifier indicates a type of end to end quality of service (EtoE QoS) control that the base station is capable of providing, wherein the type of EtoE QoS control of the base station specifies a mechanism for determining transmission priority for a plurality of different data packets, and wherein the type of EtoE OoS control is cell congestion control or service flow priority control;
parse the base station capability identifier to obtain an EtoE QoS control capability of the base station; and
determine whether the EtoE QoS control capability of the base station matches a local EtoE QoS control capability of the gateway, wherein the EtoE QoS control capability of the base station matches the local EtoE QoS control capability of the gateway when the gateway is capable of providing the mechanism for determining transmission priority for the plurality of different data packets specified by the type of EtoE QoS control indicated by the base station capability identifier; and
in response to a determination that the EtoE QoS control capability of the base station matches the local EtoE QoS control capability of the gateway, establish EtoE QoS control between the gateway and the base station.

16. The non-transitory computer readable medium according to claim 15, wherein the instructions, when executed by the processor, cause the gateway to further send a gateway capability identifier to the base station, or send the gateway capability identifier to an intermediate network element, wherein the gateway capability identifier is a description of the local EtoE QoS control capability of the gateway.

17. The non-transitory computer readable medium according to claim 16, wherein the instructions, when executed by the processor, cause the gateway to further:
generate a downlink data packet, wherein the downlink data packet comprises the gateway capability identifier; and
send the downlink data packet to the base station.

18. The non-transitory computer readable medium according to claim 15, wherein the instructions, when executed by the processor, cause the gateway to further:
- receive an uplink data packet sent by the base station, wherein the uplink data packet comprises the base station capability identifier; and
- parse the uplink data packet to obtain the base station capability identifier.

19. The non-transitory computer readable medium according to claim 18, wherein the uplink data packet further comprises heartbeat information of the base station, and the heartbeat information is a state description of the EtoE QoS control capability supported by the base station, and wherein the instructions, when executed by the processor, cause the gateway to further:
- parse the uplink data packet to obtain the heartbeat information, and
- determine a state of the EtoE QoS control capability of the base station according to the heartbeat information.

* * * * *

UNITED STATES PATENT AND TRADEMARK OFFICE
CERTIFICATE OF CORRECTION

PATENT NO. : 10,136,362 B2  
APPLICATION NO. : 15/142978  
DATED : November 20, 2018  
INVENTOR(S) : Min Liao Page 1 of 1

It is certified that error appears in the above-identified patent and that said Letters Patent is hereby corrected as shown below:

In the Claims

In Column 48, Line 35, Claim 15, delete "the type of EtoE OoS control" and insert --the type of EtoE QoS control--.

Signed and Sealed this  
Twenty-sixth Day of February, 2019

Andrei Iancu  
*Director of the United States Patent and Trademark Office*